(12) United States Patent
Izuha

(10) Patent No.: US 8,112,724 B2
(45) Date of Patent: Feb. 7, 2012

(54) METHOD OF DESIGNING SEMICONDUCTOR INTEGRATED CIRCUIT, APPARATUS FOR DESIGNING SEMICONDUCTOR INTEGRATED CIRCUIT, RECORDING MEDIUM, AND MASK MANUFACTURING METHOD

(75) Inventor: Kyoko Izuha, Kanagawa (JP)

(73) Assignee: Sony Corporation, Tokyo (JP)

( * ) Notice: Subject to any disclaimer, the term of this patent is extended or adjusted under 35 U.S.C. 154(b) by 999 days.

(21) Appl. No.: 12/048,532

(22) Filed: Mar. 14, 2008

(65) Prior Publication Data

US 2008/0235649 A1    Sep. 25, 2008

(30) Foreign Application Priority Data

Mar. 20, 2007 (JP) ................................. 2007-072967
Jan. 18, 2008 (JP) ................................. 2008-008735

(51) Int. Cl.
  *G06F 17/50* (2006.01)
(52) U.S. Cl. ............................................... 716/50
(58) Field of Classification Search .................. 716/100, 716/50
  See application file for complete search history.

(56) References Cited

U.S. PATENT DOCUMENTS

| | | | |
|---|---|---|---|
| 6,425,117 B1 | 7/2002 | Pasch et al. | |
| 2003/0088849 A1* | 5/2003 | Yamauchi | 716/19 |
| 2007/0118824 A1* | 5/2007 | Bae et al. | 716/5 |
| 2007/0240088 A1* | 10/2007 | Tang et al. | 716/9 |
| 2008/0127029 A1* | 5/2008 | Graur et al. | 716/21 |
| 2010/0005434 A1* | 1/2010 | Wang | 716/5 |

FOREIGN PATENT DOCUMENTS

| | | |
|---|---|---|
| JP | 08-272075 | 10/1996 |
| JP | 09-319067 | 12/1997 |
| JP | 2000-182921 | 6/2000 |
| JP | 2002-299205 | 10/2002 |
| JP | 2004-279997 | 10/2004 |
| JP | 2004-341159 | 12/2004 |
| JP | 2005-049403 | 2/2005 |
| JP | 2005-156606 | 6/2005 |
| JP | 2006-058413 | 3/2006 |
| JP | 2006-126745 | 5/2006 |

OTHER PUBLICATIONS

Japanese Office Action issued on Feb. 24, 2009 corresponding to JP Patent Application No. 2008-008735.

* cited by examiner

*Primary Examiner* — Suchin Parihar
(74) *Attorney, Agent, or Firm* — SNR Denton US LLP

(57) ABSTRACT

A method of designing a semiconductor integrated circuit includes a cell arranging and wiring step of arranging and wiring cells for creating a physical layout, a design-rule checking step of verifying a shape of a second physical layout including the cells of the physical layout with reference to a rule library for design rule check, a mask-data creating step of creating mask data corresponding to the physical layout using the second physical layout when the design rule is satisfied in the design-rule checking step, a mask-data processing step of performing, when the design rule is not satisfied in the design-rule checking step, mask data processing for the verification-object second physical layout, and a mask-data creating step for creating mask data corresponding to the physical layout using the second physical layout subjected to the mask data processing in the mask-data processing data.

33 Claims, 8 Drawing Sheets

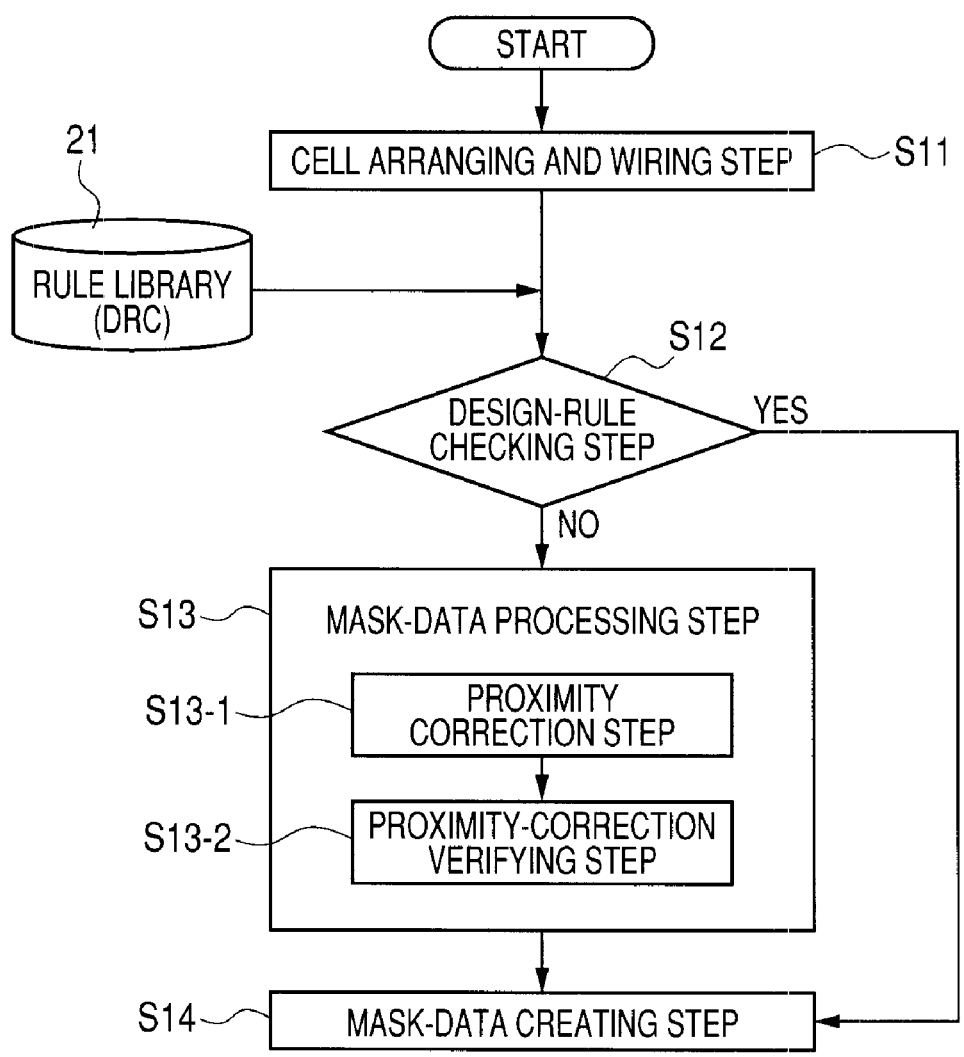

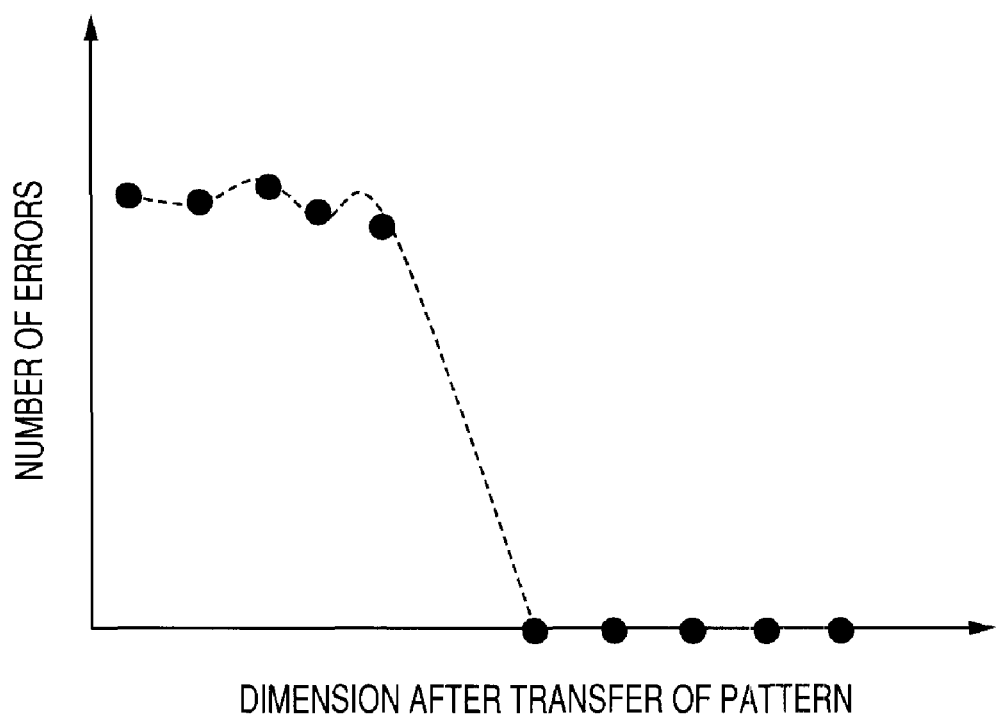

METHOD OF DESIGNING SEMICONDUCTOR INTEGRATED CIRCUIT, APPARATUS FOR DESIGNING SEMICONDUCTOR INTEGRATED CIRCUIT, RECORDING MEDIUM, AND MASK MANUFACTURING METHOD

CROSS-REFERENCES TO RELATED APPLICATIONS

The present invention contains subject matter related to Japanese Patent Applications JP 2007-072967 and JP 2008-008735 filed in the Japanese Patent Office on Mar. 20, 2007 and Jan. 18, 2008, respectively, the entire contents of which being incorporated herein by reference.

BACKGROUND OF THE INVENTION

1. Field of the Invention

The present invention relates to a simplified method of designing a semiconductor integrated circuit, an apparatus for designing a semiconductor integrated circuit, a recording medium, and a mask manufacturing method.

2. Description of the Related Art

In recent years, the progress in techniques for manufacturing semiconductor devices is extremely remarkable. Semiconductor devices with sizes with a minimum machining dimension equal to or smaller than 0.1 µm are mass-produced. Such refining of semiconductor devices is realized by the rapid progress of fine pattern forming techniques and various EDA (Electronic Design Automation) tools for generating circuit patterns. In the ages when pattern sizes were sufficiently large, a plane shape of a large-scale integrated circuit (LSI) desired to be formed on a wafer was directly drawn as a design pattern, a mask pattern faithful to the design pattern was created, the mask pattern was transferred onto the wafer by a projection optical system, and a substrate was etched, whereby a pattern substantially the same as the design pattern could be formed on the wafer.

However, as refining of a pattern advances, it is becoming difficult to faithfully form patterns in the respective processes and final finish dimensions are not the same as those of the design pattern.

In particular, in lithography and etching processes most important to attain fine machining, other pattern layout environments arranged around a pattern desired to be formed significantly influence dimension accuracy of the pattern.

Therefore, in order to reduce the influence, there are optical proximity correction (OPC) and process proximity correction (PPC) techniques and the like (herein after referred to PPC methods) for adding an auxiliary pattern to a design pattern in advance to form dimensions after machining same as those of a desired pattern (see, for example, JP-A-9-319067).

On the other hand, a design flow for a layout performed upstream the mask data processing is timing-driven. In other words, a cell with an unreasonable drive force is used to fit operation speed of a transistor in a margin. Insertion of a buffer is frequently performed. A layout obtained as a result is subjected to timing verification. Under the present situation, such a design method has to be performed.

In the technique described above, as the optical proximity correction (OPC) and process proximity correction (PPC) techniques and the like become complicated, a pattern created by a designer and a mask pattern used during exposure are significantly different from each other. Therefore, it is difficult to easily predict a finish pattern shape on a wafer.

In layout design, the insertion of a buffer for converging timing resultantly causes an increase in a chip area. Moreover, usually, timing closure is performed in a transistor drawn in dimensions under worst conditions. Therefore, a load is applied to iteration for converging timing.

In this way, there are double loads of the layout design and the mask data processing (OPC and OPC verification processing) after design data is completed. Therefore, verification employing a process simulator is inevitably performed before shipment of a design pattern.

However, process verification for the design pattern is performed at a final stage of a design process. Therefore, feedback of a verification result moves design steps backward and a large load is applied to turn around time (TAT).

In order to solve the problem of TAT, there is proposed a method of data basing in advance design patterns that cause problems in OPC and coping with the problems with any one of design data, OPC, and lithography rule check (see, for example, JP-A-2006-126745). There is also proposed a method of quickly detecting and correcting, according to a vertex density, a pattern that causes a problem in OPC and a pattern that deteriorates a yield (see, for example, JP-A-2006-126745). There is also a proposal about a design method for arranging cells subjected to OPC in advance (see, for example, U.S. Pat. No. 6,425,117).

For example, in an arranging and wiring method of the method in the past, pre-filtering of a layout (extraction of a small margin pattern) is performed in arrangement of functional cells and schematic wiring of a semiconductor integrated circuit. The pre-filtering is filtering for applying process verification to the layout, mainly extracting a pattern that does not satisfy a process margin set in advance, i.e., causes the deterioration in a yield, and removing the pattern. Transfer simulation is applied to a mask pattern created by applying optical proximity correction (OPC) processing to the extracted pattern. When there is a problem as a result of the simulation, the pattern is corrected. Concerning the pattern that does not satisfy the process margin, process verification for a layout is performed at a full-chip level before the arrangement and the wiring are performed. A layout with a small process margin is categorized on the basis of a result of the process verification to create a database or a library. When process conditions, OPC, processing for OPC verification, and the like change, it is necessary to perform the verification again. Therefore, a large load is applied to preparation for the arrangement and wiring processing.

However, a problem not sufficiently coped with by the methods described above has occurred according to the refining and complication of patterns. In the method disclosed in JP-A-2006-126745, when a pattern is corrected at a stage of artwork, an increase in TAT is caused.

In the method disclosed in U.S. Pat. No. 6,425,117, a load is applied to OPC itself applied in advance. Moreover, in JP-A-2006-126745, accuracy of screening is not attained only with information on a vertex density of a pattern.

Moreover, in pattern matching and databasing for a reduction in TAT, as a result of process verification, there are too many variations of patterns that do not satisfy the process margin and a problem is caused. Therefore, it takes time to set up a library and a database. In future, it will be more difficult to put the pattern matching and databasing to practical use.

Furthermore, when refining of a pattern advances, it is likely that there are an enormous number of patterns that do not satisfy the process margin and categorization itself of the patterns fails.

SUMMARY OF THE INVENTION

According to refining and complication of patterns, when a pattern is corrected at the stage of artwork, for example, an increase in TAT is caused, a load is applied to proximity correction itself, and accuracy of screening is not acquired.

Therefore, it is desirable to relax or exclude verification of a pattern having an enough margin and simplify design of a semiconductor integrated circuit without deteriorating screening accuracy.

According to a first embodiment of the present invention, there is provided a method of designing a semiconductor integrated circuit in creating a physical layout of the semiconductor integrated circuit from semiconductor integrated circuit design data. The method of designing a semiconductor integrated circuit includes a cell arranging and wiring step of arranging and wiring cells for creating the physical layout, a design-rule checking step of verifying a shape of a second physical layout including the cells of the physical layout with reference to a rule library for design rule check, a mask-data creating step of creating mask data corresponding to the physical layout using the second physical layout when the design rule is satisfied in the design-rule checking step, a mask-data processing step of performing, when the design rule is not satisfied in the design-rule checking step, mask data processing for the verification-object second physical layout, and a mask-data creating step for creating mask data corresponding to the physical layout using the second physical layout subjected to the mask data processing in the mask-data processing step.

In the method of designing a semiconductor integrated circuit according to this embodiment, the design-rule checking step after the cell arranging and wiring step is performed in a full-chip size and a pattern having an enough margin is excluded from a verification object. Therefore, by making use of work of proximity correction and process margin verification in the past performed in advance when a library and a database for pattern matching are created and, on the other hand, excluding a pattern for which verification is unnecessary from a processing flow, it is possible to realize efficiency of processing. Even if the verification object is omitted from the database and the library, since a pattern having an enough margin from the beginning is extracted, the pattern is simply set as an object of normal processing.

According to a second embodiment of the present invention, there is provided a method of designing a semiconductor integrated circuit in creating a physical layout of the semiconductor integrated circuit from semiconductor integrated circuit design data. The method of designing a semiconductor integrated circuit includes a cell arranging and wiring step of arranging and wiring cells for creating the physical layout, a design-rule checking step of verifying a shape of a second physical layout including the cells of the physical layout with reference to a rule library for design rule check, a correction judging step of judging whether proximity correction is applied to the second physical layout that satisfies the design rule in the design-rule checking step, a mask-data creating step of creating, when it is judged in the correction judging step that the correction is unnecessary, mask data corresponding to the physical layout using the second physical layout for which it is judged that the correction is unnecessary, a proximity correction step of applying, when it is judged in the correction judging step that the correction is necessary, proximity correction to the judgment-object second physical layout, a mask-data creating step of creating mask data corresponding to the physical layout using the second physical layout corrected in the proximity correction step, a proximity correction step of applying, when the design rule is not satisfied in the design-rule checking step, proximity correction to the verification-object second physical layout, a process-margin verifying step of verifying whether the second physical layout subjected to the proximity correction in the proximity correction step has a predetermined process margin, a rule adding step of extracting, when it is judged in the process-margin verifying step that the second physical layout has the process margin, a judgment-object second physical layout, adding a rule of the second physical layout to the rule library, and creating mask data of the physical layout corresponding to the second physical layout, an amending, correcting, and verifying step of performing, when it is judged in the process-margin verifying step that the second physical layout does not have the process margin, correction, artwork, proximity correction, and proximity correction verification for a pattern of the judgment-object second physical layout, and a mask-data creating step of creating mask data corresponding to the physical layout using the second physical layout subjected to the amending, correcting, and verifying step.

In the method of designing a semiconductor integrated circuit according to this embodiment, the design-rule checking step after the cell arranging and wiring step is performed in a full-chip size and conditions for the proximity correction and the proximity correction verification are relaxed for a pattern having an enough margin or the pattern is excluded from a verification object. Therefore, by making use of work of proximity correction and process margin verification in the past performed in advance when a library and a database for pattern matching are created and, on the other hand, excluding a pattern for which verification is unnecessary from a processing flow, it is possible to realize efficiency of processing. Even if the verification object is omitted from the database and the library, since a pattern having an enough margin from the beginning is extracted, the pattern is simply set as an object of normal processing.

According to a third embodiment of the present invention, there is provided a method of designing a semiconductor integrated circuit in creating a physical layout of the semiconductor integrated circuit from semiconductor integrated circuit design data. The method of designing a semiconductor integrated circuit includes a cell arranging and wiring step of arranging and wiring cells for creating the physical layout, a step of setting thresholds concerning contrast and coverage of an image on a semiconductor substrate, a contrast checking step of calculating contrast of the physical layout and comparing, with reference to the threshold concerning contrast of a layout obtained by arranging and wiring the respective cells, the threshold with a result of the calculation of contrast, an amending step of performing, when the result of the calculation of contrast is equal to or lower than the threshold concerning contrast in the contrast checking step, acquisition of transfer information of an area where the contrast is equal to or lower than the threshold, amendment of a physical layout of the area, and artwork processing, a correcting and verifying step of applying proximity correction and proximity correction verification to the physical layout subjected to the amending step, a mask-data creating step of creating mask data using the physical layout subjected to the correcting and verifying step, a coverage checking step of comparing, when a result of the calculation of contrast of the layout is larger than the threshold concerning contrast in the contrast checking step, with reference to the threshold concerning coverage of the physical layout, the threshold with information concerning coverage of the obtained layout, and a layout extracting step of extracting, when the information concerning the coverage satisfies the threshold concerning coverage in the coverage checking step, a judgment-object physical layout. The correcting and verifying step and the subsequent steps are applied to the physical layout obtained in the layout extracting step. When the information concerning coverage does not satisfy the threshold concerning coverage in the coverage checking step, the amending and the correcting and verifying steps and the subsequent steps for the physical layout are performed.

In the method of designing a semiconductor integrated circuit according to this embodiment, the contrast checking step after the cell arranging and wiring step is performed in a full-chip size and conditions for the proximity correction are relaxed for a pattern having an enough margin or the pattern is excluded from a verification object. Therefore, by making use of work of proximity correction and process margin verification in the past performed in advance when a library and a database for pattern matching are created and, on the other hand, excluding a pattern for which verification is unnecessary from a processing flow, it is possible to realize efficiency of processing. Even if the verification object is omitted from the database and the library, since a pattern having an enough margin from the beginning is extracted, the pattern is simply set as an object of normal processing.

According to a fourth embodiment, there is provided a method of designing a semiconductor integrated circuit in creating a physical layout of the semiconductor integrated circuit from semiconductor integrated circuit design data. The method of designing a semiconductor integrated circuit includes a cell arranging and wiring step of arranging and wiring cells for creating the physical layout, a design-rule checking step of verifying, with reference to a rule library for design rule check, whether a second physical layout of a portion including the cells of the physical layout has a predetermined process margin, a correction judging step of judging, when the second physical layout has the process margin in the design-rule checking step, whether the second physical layout having the margin should be subjected to proximity correction, a mask-data creating step of creating, when it is judged in the correction judging step that the correction is unnecessary, mask data corresponding to the physical layout using the second physical layout for which it is judged that the correction is unnecessary, a correcting and verifying step of subjecting, when it is judged in the correction judging step that the correction is necessary, the judgment-object second physical layout to proximity correction and proximity correction verification, a mask-data creating step of creating mask data corresponding to the physical layout using the second physical layout subjected to the proximity correction and the proximity correction verification in the correcting and verifying step, a correcting and verifying step of subjecting, when the second physical layout does not have the process margin in the design-rule checking step, the verification-object second physical layout to proximity correction and proximity correction verification, a step of a threshold concerning a yield of the second physical layout, a yield evaluating step of comparing, with reference to the threshold, the threshold with information concerning a yield of the second physical layout, a rule adding step of extracting, when the information concerning a yield satisfies the threshold concerning a yield in the yield evaluating step, a judgment-object second physical layout, and adding a rule of the second physical layout to the rule library, an amending step of performing, when the information concerning a yield does not satisfy the threshold concerning a yield in the yield evaluating step, acquisition of transfer information of an area where the yield is equal to or lower than the threshold, amendment of a second physical layout of the area, and artwork processing, a correcting and verifying step of applying proximity correction and proximity correction verification to the second physical layout subjected to the amending step, and a mask-data creating step of creating mask data using the second physical layout subjected to the correcting and verifying step.

In the method of designing a semiconductor integrated circuit according to this embodiment, the design-rule checking step after the cell arranging and wiring step is performed in a full-chip size and conditions for the proximity correction and the proximity correction verification are relaxed for a pattern having an enough margin or the pattern is excluded from a verification object. Therefore, by making use of work of proximity correction and process margin verification in the past performed in advance when a library and a database for pattern matching are created and, on the other hand, excluding a pattern for which verification is unnecessary from a processing flow, it is possible to realize efficiency of processing. Even if the verification object is omitted from the database and the library, since a pattern having an enough margin from the beginning is extracted, the pattern is simply set as an object of normal processing.

According to a fifth embodiment of the present invention, there is provided a method of designing a semiconductor integrated circuit in creating a physical layout of the semiconductor integrated circuit from semiconductor integrated circuit design data. The method of designing a semiconductor integrated circuit includes a cell arranging and wiring step of arranging and wiring cells for creating the physical layout, a yield evaluating step of comparing, with reference to a threshold concerning a yield of a second physical layout in a portion including the cells of the physical layout, the threshold with information concerning a yield of the second physical layout, a layout extracting step of extracting, when the information concerning a yield satisfies the threshold concerning a yield in the yield evaluating step, a judgment-object physical layout, a correcting and verifying step of applying proximity correction and proximity correction verification to the physical layout obtained in the layout extracting step, an amending step of performing, when the information concerning a yield does not satisfy the threshold concerning a yield in the yield evaluating step, acquisition of transfer information of an area where the yield is equal to or lower than the threshold, amendment of a second physical layout of the area, and artwork processing, a correcting and verifying step of applying proximity correction and proximity correction verification to the second physical layout subjected to the amending step, and a mask-data creating step of creating mask data using the second physical layout subjected to the correcting and verifying step.

In the method of designing a semiconductor integrated circuit according to this embodiment, the yield evaluating step of comparing, with reference to a threshold concerning a yield of a second physical layout, the threshold with information concerning a yield of the second physical layout is provided. Therefore, it is possible to realize a reduction in time for designing a semiconductor integrated circuit.

According to a sixth embodiment of the present invention, there is provided an apparatus for designing a semiconductor integrated circuit that carries out a method of designing a semiconductor integrated circuit in creating a physical layout of the semiconductor integrated circuit from semiconductor integrated circuit design data. The method of designing a semiconductor integrated circuit includes a cell arranging and wiring step of arranging and wiring cells for creating the physical layout, a design-rule checking step of verifying, with reference to a rule library for design rule check, a shape of a second physical layout including the cells of the physical layout, a mask-data creating step of creating, when the design rule is satisfied in the design-rule checking step, mask data corresponding to the physical layout using the second physical layout, a mask-data processing step of performing, when the design rule is not satisfied in the design-rule checking step, mask data processing for the verification-object second physical layout, and a mask data creating step of creating, using the second physical layout subjected to the mask data processing in the mask-data processing step, mask data corresponding to the physical layout.

In the apparatus for designing a semiconductor integrated circuit according to this embodiment, since the method of designing a semiconductor integrated circuit according to the embodiment is used, as explained above, the design-rule checking step after the cell arranging and wiring step is performed in a full-chip size and a pattern having an enough margin is excluded from a verification object. Therefore, it is possible to realize efficiency of processing.

According to a seventh embodiment of the present invention, there is provided a recording medium having recorded therein a method of designing a semiconductor integrated circuit in creating a physical layout of a semiconductor integrated circuit from semiconductor integrated circuit design data. The method of designing a semiconductor integrated circuit includes a cell arranging and wiring step of arranging and wiring cells for creating the physical layout, a design-rule checking step of verifying, with reference to a rule library for design rule check, a shape of a second physical layout including the cells of the physical layout, a mask-data creating step of creating, when the design rule is satisfied in the design-rule checking step, mask data corresponding to the physical layout using the second physical layout, a mask-data processing step of performing, when the design rule is not satisfied in the design-rule checking step, mask data processing for the verification-object second physical layout, and a mask data creating step of creating, using the second physical layout subjected to the mask data processing in the mask-data processing step, mask data corresponding to the physical layout.

In the recording medium according to this embodiment, since the method of designing a semiconductor integrated circuit according to the embodiment is used, as explained above, the design-rule checking step after the cell arranging and wiring step is performed in a full-chip size and a pattern having an enough margin is excluded from a verification object. Therefore, it is possible to realize efficiency of processing.

According to an eighth embodiment of the present invention, there is provided a mask manufacturing method for manufacturing a mask using a method of designing a semiconductor integrated circuit in creating a physical layout of a semiconductor integrated circuit from semiconductor integrated circuit design data. The method of designing a semiconductor integrated circuit includes a cell arranging and wiring step of arranging and wiring cells for creating the physical layout, a design-rule checking step of verifying, with reference to a rule library for design rule check, a shape of a second physical layout including the cells of the physical layout, a mask-data creating step of creating, when the design rule is satisfied in the design-rule checking step, mask data corresponding to the physical layout using the second physical layout, a mask-data processing step of performing, when the design rule is not satisfied in the design-rule checking step, mask data processing for the verification-object second physical layout, and a mask data creating step of creating, using the second physical layout subjected to the mask data processing in the mask-data processing step, mask data corresponding to the physical layout.

In the mask manufacturing method for a semiconductor integrated circuit according to this embodiment, since the method of designing a semiconductor integrated circuit according to the embodiment is used, as explained above, the design-rule checking step after the cell arranging and wiring step is performed in a full-chip size and a pattern having an enough margin is excluded from a verification object. Therefore, it is possible to realize efficiency of processing.

According to a ninth embodiment of the present invention, there is provided an apparatus for designing a semiconductor integrated circuit that carries out a method of designing a semiconductor integrated circuit in creating a physical layout of a semiconductor integrated circuit from semiconductor integrated circuit design data. The method of designing a semiconductor integrated circuit includes a cell arranging and wiring step of arranging and wiring cells for creating the physical layout, a design-rule checking step of verifying, with reference to a rule library for design rule check, a shape of a second physical layout including the cells of the physical layout, a correction judging step of judging whether proximity correction is applied to the second physical layout that satisfies the design rule in the design-rule checking step, a mask-data creating step of creating, when it is judged in the correction judging step that the correction is unnecessary, mask data corresponding to the physical layout using the second physical layout for which it is judged that the correction is unnecessary, a proximity correction step of applying, when it is judged in the correction judging step that the correction is necessary, proximity correction to the judgment-object second physical layout, a mask-data creating step of creating mask data corresponding to the physical layout using the second physical layout corrected in the proximity correction step, a proximity correction step of applying, when the design rule is not satisfied in the design-rule checking step, proximity correction to the verification-object second physical layout, a process-margin verifying step of verifying whether the second physical layout subjected to the proximity correction in the proximity correction step has a predetermined process margin, a rule adding step of extracting, when it is judged in the process-margin verifying step that the second physical layout has the process margin, a judgment-object second physical layout, adding a rule of the second physical layout to the rule library, and creating mask data of the physical layout corresponding to the second physical layout, an amending, correcting, and verifying step of performing correction, artwork, proximity correction, and proximity correction verification for a pattern of the judgment-object second physical layout, and a mask-data creating step of creating mask data corresponding to the physical layout using the second physical layout subjected to the amending, correcting, and verifying step.

In the apparatus for designing a semiconductor integrated circuit according to this embodiment, since the method of designing a semiconductor integrated circuit according to the embodiment is used, as explained above, the design-rule checking step after the cell arranging and wiring step is performed in a full-chip size and conditions for the proximity correction and the proximity correction verification are relaxed for a pattern having an enough margin or the pattern is excluded from a verification object. Therefore, by making use of work of proximity correction and process margin verification in the past performed in advance when a library and a database for pattern matching are created and, on the other hand, excluding a pattern for which verification is unnecessary from a processing flow, it is possible to realize efficiency of processing.

According to a tenth embodiment of the present invention, there is provided a recording medium having recorded therein a method of designing a semiconductor integrated circuit in creating a physical layout of a semiconductor integrated circuit from semiconductor integrated circuit design data. The method of designing a semiconductor integrated circuit includes a cell arranging and wiring step of arranging and wiring cells for creating the physical layout, a design-rule checking step of verifying, with reference to a rule library for design rule check, a shape of a second physical layout including the cells of the physical layout, a correction judging step of judging whether proximity correction is applied to the second physical layout that satisfies the design rule in the design-rule checking step, a mask-data creating step of creating, when it is judged in the correction judging step that the correction is unnecessary, mask data corresponding to the physical layout using the second physical layout for which it is judged that the correction is unnecessary, a proximity correction step of applying, when it is judged in the correction judging step that the correction is necessary, proximity correction to the judgment-object second physical layout, a mask-data creating step of creating mask data corresponding to the physical layout using the second physical layout corrected in the proximity correction step, a proximity correction step of applying, when the design rule is not satisfied in the design-rule checking step, proximity correction to the verification-object second physical layout, a process-margin verifying step of verifying whether the second physical layout subjected to the proximity correction in the proximity correction step has a predetermined process margin, a rule adding step of extracting, when it is judged in the process-margin verifying step that the second physical layout has the process margin, a judgment-object second physical layout, adding a rule of the second physical layout to the rule library, and creating mask data of the physical layout corresponding to the second physical layout, an amending, correcting, and verifying step of performing correction, artwork, proximity correction, and proximity correction verification for a pattern of the judgment-object second physical layout, and a mask-data creating step of creating mask data corresponding to the physical layout using the second physical layout subjected to the amending, correcting, and verifying step.

In the recording medium according to this embodiment, since the method of designing a semiconductor integrated circuit according to the embodiment is used, as explained above, the design-rule checking step after the cell arranging and wiring step is performed in a full-chip size and conditions for the proximity correction and the proximity correction verification are relaxed for a pattern having an enough margin or the pattern is excluded from a verification object. Therefore, by making use of work of proximity correction and process margin verification in the past performed in advance when a library and a database for pattern matching are created and, on the other hand, excluding a pattern for which verification is unnecessary from a processing flow, it is possible to realize efficiency of processing.

According to an eleventh embodiment of the present invention, there is provided a mask manufacturing method for manufacturing a mask using a method of designing a semiconductor integrated circuit in creating a physical layout of a semiconductor integrated circuit from semiconductor integrated circuit design data. The method of designing a semiconductor integrated circuit includes a cell arranging and wiring step of arranging and wiring cells for creating the physical layout, a design-rule checking step of verifying, with reference to a rule library for design rule check, a shape of a second physical layout including the cells of the physical layout, a correction judging step of judging whether proximity correction is applied to the second physical layout that satisfies the design rule in the design-rule checking step, a mask-data creating step of creating, when it is judged in the correction judging step that the correction is unnecessary, mask data corresponding to the physical layout using the second physical layout for which it is judged that the correction is unnecessary, a proximity correction step of applying, when it is judged in the correction judging step that the correction is necessary, proximity correction to the judgment-object second physical layout, a mask-data creating step of creating mask data corresponding to the physical layout using the second physical layout corrected in the proximity correction step, a proximity correction step of applying, when the design rule is not satisfied in the design-rule checking step, proximity correction to the verification-object second physical layout, a process-margin verifying step of verifying whether the second physical layout subjected to the proximity correction in the proximity correction step has a predetermined process margin, a rule adding step of extracting, when it is judged in the process-margin verifying step that the second physical layout has the process margin, a judgment-object second physical layout, adding a rule of the second physical layout to the rule library, and creating mask data of the physical layout corresponding to the second physical layout, an amending, correcting, and verifying step of performing correction, artwork, proximity correction, and proximity correction verification for a pattern of the judgment-object second physical layout, and a mask-data creating step of creating mask data corresponding to the physical layout using the second physical layout subjected to the amending, correcting, and verifying step.

In the mask manufacturing method according to this embodiment, since the method of designing a semiconductor integrated circuit according to the embodiment is used, as explained above, the design-rule checking step after the cell arranging and wiring step is performed in a full-chip size and conditions for the proximity correction and the proximity correction verification are relaxed for a pattern having an enough margin or the pattern is excluded from a verification object. Therefore, by making use of work of proximity correction and process margin verification in the past performed in advance when a library and a database for pattern matching are created and, on the other hand, excluding a pattern for which verification is unnecessary from a processing flow, it is possible to realize efficiency of processing.

According to a twelfth embodiment of the present invention, there is provided an apparatus for designing a semiconductor integrated circuit that carries out a method of designing a semiconductor integrated circuit in creating a physical layout of the semiconductor integrated circuit from semiconductor integrated circuit design data. The method of designing a semiconductor integrated circuit includes a cell arranging and wiring step of arranging and wiring cells for creating the physical layout, a contrast checking step of calculating contrast of the physical layout and comparing, with reference to a threshold concerning contrast of an image on a semiconductor substrate of a layout obtained by arranging and wiring the respective cells, the threshold with a result of the calculation of contrast, an amending step of performing, when the result of the calculation of contrast is equal to or lower than the threshold concerning contrast in the contrast checking step, acquisition of transfer information of an area where the contrast is equal to or lower than the threshold, amendment of a physical layout of the area, and artwork processing, a correcting and verifying step of applying proximity correction and proximity correction verification to the physical layout subjected to the amending step, a mask-data creating step of creating mask data using the physical layout subjected to the correcting and verifying step, a coverage checking step of comparing, when a result of the calculation of contrast of the layout is larger than the threshold concerning contrast in the contrast checking step, with reference to the threshold concerning coverage of the physical layout, the threshold with information concerning coverage of the obtained layout, and a layout extracting step of extracting, when the information concerning the coverage satisfies the threshold concerning coverage in the coverage checking step, a judgment-object physical layout. The correcting and verifying step and the subsequent steps are applied to the physical layout obtained in the layout extracting step. When the information concerning coverage does not satisfy the threshold concerning coverage in the coverage checking step, the amending and the correcting and verifying steps and the subsequent steps are performed.

In the apparatus for designing a semiconductor integrated circuit according to this embodiment, since the method of designing a semiconductor integrated circuit according to the embodiment is used, as explained above, the contrast checking step after the cell arranging and wiring step is performed in a full-chip size and conditions for the proximity correction are relaxed for a pattern having an enough margin or the pattern is excluded from a verification object. Therefore, by making use of work of proximity correction and lithography verification in the past performed in advance when a library and a database for pattern matching are created and, on the other hand, excluding a pattern for which verification is unnecessary from a processing flow, it is possible to realize efficiency of processing.

According to a thirteenth embodiment of the present invention, there is provided a recording medium having recorded therein a method of designing a semiconductor integrated circuit in creating a physical layout of the semiconductor integrated circuit from semiconductor integrated circuit design data. The method of designing a semiconductor integrated circuit includes a cell arranging and wiring step of arranging and wiring cells for creating the physical layout, a contrast checking step of calculating contrast of the physical layout and comparing, with reference to a threshold concerning contrast of an image on a semiconductor substrate of a layout obtained by arranging and wiring the respective cells, the threshold with a result of the calculation of contrast, an amending step of performing, when the result of the calculation of contrast is equal to or lower than the threshold concerning contrast in the contrast checking step, acquisition of transfer information of an area where the contrast is equal to or lower than the threshold, amendment of a physical layout of the area, and artwork processing, a correcting and verifying step of applying proximity correction and proximity correction verification to the physical layout subjected to the amending step, a mask-data creating step of creating mask data using the physical layout subjected to the correcting and verifying step, a coverage checking step of comparing, when a result of the calculation of contrast of the layout is larger than the threshold concerning contrast in the contrast checking step, with reference to the threshold concerning coverage of the physical layout, the threshold with information concerning coverage of the obtained layout, and a layout extracting step of extracting, when the information concerning the coverage satisfies the threshold concerning coverage in the coverage checking step, a judgment-object physical layout. The correcting and verifying step and the subsequent steps are applied to the physical layout obtained in the layout extracting step. When the information concerning coverage does not satisfy the threshold concerning coverage in the coverage checking step, the amending and the correcting and verifying steps and the subsequent steps are performed.

In the recording medium according to this embodiment, since the method of designing a semiconductor integrated circuit according to the embodiment is used, as explained above, the contrast checking step after the cell arranging and wiring step is performed in a full-chip size and conditions for the proximity correction are relaxed for a pattern having an enough margin or the pattern is excluded from a verification object. Therefore, by making use of work of proximity correction and lithography verification in the past performed in advance when a library and a database for pattern matching are created and, on the other hand, excluding a pattern for which verification is unnecessary from a processing flow, it is possible to realize efficiency of processing.

According to a fourteenth embodiment of the present invention, there is provided a mask manufacturing method for manufacturing a mask using a method of designing a semiconductor integrated circuit in creating a physical layout of the semiconductor integrated circuit from semiconductor integrated circuit design data. The method of designing a semiconductor integrated circuit includes a cell arranging and wiring step of arranging and wiring cells for creating the physical layout, a contrast checking step of calculating contrast of the physical layout and comparing, with reference to a threshold concerning contrast of an image on a semiconductor substrate of a layout obtained by arranging and wiring the respective cells, the threshold with a result of the calculation of contrast, an amending step of performing, when the result of the calculation of contrast is equal to or lower than the threshold concerning contrast in the contrast checking step, acquisition of transfer information of an area where the contrast is equal to or lower than the threshold, amendment of a physical layout of the area, and artwork processing, a correcting and verifying step of applying proximity correction and proximity correction verification to the physical layout subjected to the amending step, a mask-data creating step of creating mask data using the physical layout subjected to the correcting and verifying step, a coverage checking step of comparing, when a result of the calculation of contrast of the layout is larger than the threshold concerning contrast in the contrast checking step, with reference to the threshold concerning coverage of the physical layout, the threshold with information concerning coverage of the obtained layout, and a layout extracting step of extracting, when the information concerning the coverage satisfies the threshold concerning coverage in the coverage checking step, a judgment-object physical layout. The correcting and verifying step and the subsequent steps are applied to the physical layout obtained in the layout extracting step. When the information concerning coverage does not satisfy the threshold concerning coverage in the coverage checking step, the amending and the correcting and verifying steps and the subsequent steps are performed.

In the mask manufacturing method according to this embodiment, since the method of designing a semiconductor integrated circuit according to the embodiment is used, as explained above, the contrast checking step after the cell arranging and wiring step is performed in a full-chip size and conditions for the proximity correction are relaxed for a pattern having an enough margin or the pattern is excluded from a verification object. Therefore, by making use of work of proximity correction and lithography verification in the past performed in advance when a library and a database for pattern matching are created and, on the other hand, excluding a pattern for which verification is unnecessary from a processing flow, it is possible to realize efficiency of processing.

According to a fifteenth embodiment of the present invention, there is provided an apparatus for designing a semiconductor integrated circuit that carries out a method of designing a semiconductor integrated circuit in creating a physical layout of the semiconductor integrated circuit from semiconductor integrated circuit design data. The method of designing a semiconductor integrated circuit includes a cell arranging and wiring step of arranging and wiring cells for creating the physical layout, a design-rule checking step of verifying, with reference to a rule library for design rule check, whether a second physical layout of a portion including the cells of the physical layout has a predetermined process margin, a correction judging step of judging, when the second physical layout has the process margin in the design-rule checking step, whether the second physical layout having the margin should be corrected, a mask-data creating step of creating, when it is judged in the correction judging step that the correction is unnecessary, mask data corresponding to the physical layout using the second physical layout for which it is judged that the correction is unnecessary, a correcting and verifying step of subjecting, when it is judged in the correction judging step that the correction is necessary, the judgment-object second physical layout to proximity correction and proximity correction verification, a mask-data creating step of creating mask data corresponding to the physical layout using the second physical layout subjected to the proximity correction and the proximity correction verification in the correcting and verifying step, a correcting and verifying step of subjecting, when the second physical layout does not have the process margin in the design-rule checking step, the verification-object second physical layout to proximity correction and proximity correction verification, a yield evaluating step of comparing, with reference to a threshold concerning a yield of the second physical layout, the threshold with information concerning a yield of the second physical layout, a rule adding step of extracting, when the information concerning a yield satisfies the threshold concerning a yield in the yield evaluating step, a judgment-object second physical layout, and adding a rule of the second physical layout to the rule library, an amending step of performing, when the information concerning a yield does not satisfy the threshold concerning a yield in the yield evaluating step, acquisition of transfer information of an area where the yield is equal to or lower than the threshold, amendment of a second physical layout of the area, and artwork processing, a correcting and verifying step of applying proximity correction and proximity correction verification to the second physical layout subjected to the amending step, and a mask-data creating step of creating mask data using the second physical layout subjected to the correcting and verifying step.

In the apparatus for designing a semiconductor integrated circuit according to this embodiment, the design-rule checking step after the cell arranging and wiring step is performed in a full-chip size and conditions for the proximity correction and the proximity correction verification are relaxed for a pattern having an enough margin or the pattern is excluded from a verification object. Therefore, by making use of work of proximity correction and lithography verification in the past performed in advance when a library and a database for pattern matching are created and, on the other hand, excluding a pattern for which verification is unnecessary from a processing flow, it is possible to realize efficiency of processing. Even if the verification object is omitted from the database and the library, since a pattern having an enough margin from the beginning is extracted, the pattern is simply set as an object of normal processing.

According to a sixteenth embodiment of the present invention, there is provided a recording medium having recorded therein a method of designing a semiconductor integrated circuit in creating a physical layout of the semiconductor integrated circuit from semiconductor integrated circuit design data. The method of designing a semiconductor integrated circuit includes a cell arranging and wiring step of arranging and wiring cells for creating the physical layout, a design-rule checking step of verifying, with reference to a rule library for design rule check, whether a second physical layout of a portion including the cells of the physical layout has a predetermined process margin, a correction judging step of judging, when the second physical layout has the process margin in the design-rule checking step, whether the second physical layout having the margin should be corrected, a mask-data creating step of creating, when it is judged in the correction judging step that the correction is unnecessary, mask data corresponding to the physical layout using the second physical layout for which it is judged that the correction is unnecessary, a correcting and verifying step of subjecting, when it is judged in the correction judging step that the correction is necessary, the judgment-object second physical layout to proximity correction and proximity correction verification, a mask-data creating step of creating mask data corresponding to the physical layout using the second physical layout subjected to the proximity correction and the proximity correction verification in the correcting and verifying step, a correcting and verifying step of subjecting, when the second physical layout does not have the process margin in the design-rule checking step, the verification-object second physical layout to proximity correction and proximity correction verification, a yield evaluating step of comparing, with reference to a threshold concerning a yield of the second physical layout, the threshold with information concerning a yield of the second physical layout, a rule adding step of extracting, when the information concerning a yield satisfies the threshold concerning a yield in the yield evaluating step, a judgment-object second physical layout, and adding a rule of the second physical layout to the rule library, an amending step of performing, when the information concerning a yield does not satisfy the threshold concerning a yield in the yield evaluating step, acquisition of transfer information of an area where the yield is equal to or lower than the threshold, amendment of a second physical layout of the area, and artwork processing, a correcting and verifying step of applying proximity correction and proximity correction verification to the second physical layout subjected to the amending step, and a mask-data creating step of creating mask data using the second physical layout subjected to the correcting and verifying step.

In the recording medium according to this embodiment, the design-rule checking step after the cell arranging and wiring step is performed in a full-chip size and conditions for the proximity correction and the proximity correction verification are relaxed for a pattern having an enough margin or the pattern is excluded from a verification object. Therefore, by making use of work of proximity correction and lithography verification in the past performed in advance when a library and a database for pattern matching are created and, on the other hand, excluding a pattern for which verification is unnecessary from a processing flow, it is possible to realize efficiency of processing. Even if the verification object is omitted from the database and the library, since a pattern having an enough margin from the beginning is extracted, the pattern is simply set as an object of normal processing.

According to a seventeenth embodiment of the present invention, there is provided a mask manufacturing method for manufacturing a mask using a method of designing a semiconductor integrated circuit in creating a physical layout of the semiconductor integrated circuit from semiconductor integrated circuit design data. The method of designing a semiconductor integrated circuit includes a cell arranging and wiring step of arranging and wiring cells for creating the physical layout, a design-rule checking step of verifying, with reference to a rule library for design rule check, whether a second physical layout of a portion including the cells of the physical layout has a predetermined process margin, a correction judging step of judging, when the second physical layout has the process margin in the design-rule checking step, whether the second physical layout having the margin should be corrected, a mask-data creating step of creating, when it is judged in the correction judging step that the correction is unnecessary, mask data corresponding to the physical layout using the second physical layout for which it is judged that the correction is unnecessary, a correcting and verifying step of subjecting, when it is judged in the correction judging step that the correction is necessary, the judgment-object second physical layout to proximity correction and proximity correction verification, a mask-data creating step of creating mask data corresponding to the physical layout using the second physical layout subjected to the proximity correction and the proximity correction verification in the correcting and verifying step, a correcting and verifying step of subjecting, when the second physical layout does not have the process margin in the design-rule checking step, the verification-object second physical layout to proximity correction and proximity correction verification, a yield evaluating step of comparing, with reference to a threshold concerning a yield of the second physical layout, the threshold with information concerning a yield of the second physical layout, a rule adding step of extracting, when the information concerning a yield satisfies the threshold concerning a yield in the yield evaluating step, a judgment-object second physical layout, and adding a rule of the second physical layout to the rule library, an amending step of performing, when the information concerning a yield does not satisfy the threshold concerning a yield in the yield evaluating step, acquisition of transfer information of an area where the yield is equal to or lower than the threshold, amendment of a second physical layout of the area, and artwork processing, a correcting and verifying step of applying proximity correction and proximity correction verification to the second physical layout subjected to the amending step, and a mask-data creating step of creating mask data using the second physical layout subjected to the correcting and verifying step.

In the mask manufacturing method according to this embodiment, the design-rule checking step after the cell arranging and wiring step is performed in a full-chip size and conditions for the proximity correction and the proximity correction verification are relaxed for a pattern having an enough margin or the pattern is excluded from a verification object. Therefore, by making use of work of proximity correction and lithography verification in the past performed in advance when a library and a database for pattern matching are created and, on the other hand, excluding a pattern for which verification is unnecessary from a processing flow, it is possible to realize efficiency of processing. Even if the verification object is omitted from the database and the library, since a pattern having an enough margin from the beginning is extracted, the pattern is simply set as an object of normal processing.

With the method of designing a semiconductor integrated circuit according to the first embodiment of the present invention, there is an advantage that it is possible to reduce a load of a library for pattern matching. Since data of full-chip processing is reduced and verification of a pattern having an enough margin is excluded, there is an advantage that it is possible to reduce a total processing load and simplify designing of a semiconductor integrated circuit without deteriorating screening accuracy.

With the method of designing a semiconductor integrated circuit according to the second embodiment of the present invention, there is an advantage that it is possible to reduce a load of a library for pattern matching. Since data of full-chip processing is reduced and verification of a pattern having an enough margin is relaxed or excluded, there is an advantage that it is possible to reduce a total processing load and simplify designing of a semiconductor integrated circuit without deteriorating screening accuracy.

With the method of designing a semiconductor integrated circuit according to the third embodiment of the present invention, there is an advantage that it is possible to simplify designing of a semiconductor integrated circuit without deteriorating screening accuracy. Since library creation is not performed, there is an advantage that it is possible to reduce a load of library creation compared with the method of designing a semiconductor integrated circuit according to the second embodiment.

With the method of designing a semiconductor integrated circuit according to the fourth embodiment of the present invention, since screening of a layout is performed by using a yield evaluation value, there is an advantage that it is possible to judge all kinds of processing in terms of an yield, judge that a yield only has to be secured even if a process margin is small, and realize efficiency and simplification of an overall design flow without deteriorating screening accuracy in different viewpoints.

With the method of designing a semiconductor integrated circuit according to the fifth embodiment of the present invention, since screening of a layout is performed by using a yield evaluation value, there is an advantage that it is possible to judge all kinds of processing in terms of an yield, judge that a yield only has to be secured even if a process margin is small, and realize efficiency and simplification of an overall design flow without deteriorating screening accuracy in different viewpoints.

With the apparatus for designing a semiconductor integrated circuit according to the sixth embodiment of the present invention, since the method of designing a semiconductor integrated circuit according to the first embodiment is used, there is an advantage that an effect same as the above is obtained.

With the recording medium according to the seventh embodiment of the present invention, since the method of designing a semiconductor integrated circuit according to the first embodiment is used, there is an advantage that an effect same as the above is obtained.

With the mask manufacturing method according to the eighth embodiment of the present invention, since the method of designing a semiconductor integrated circuit according to the first embodiment is used, there is an advantage that an effect same as the above is obtained.

With the apparatus for designing a semiconductor integrated circuit according to the ninth embodiment of the present invention, since the method of designing a semiconductor integrated circuit according to the second embodiment is used, there is an advantage that an effect same as the above is obtained.

With the recording medium according to the tenth embodiment of the present invention, since the method of designing a semiconductor integrated circuit according to the second embodiment is used, there is an advantage that an effect same as the above is obtained.

With the mask manufacturing method according to the eleventh embodiment of the present invention, since the method of designing a semiconductor integrated circuit according to the second embodiment is used, there is an advantage that an effect same as the above is obtained.

With the apparatus for designing a semiconductor integrated circuit according to the twelfth embodiment of the present invention, since the method of designing a semiconductor integrated circuit according to the third embodiment is used, there is an advantage that an effect same as the above is obtained.

With the recording medium according to the thirteenth embodiment of the present invention, since the method of designing a semiconductor integrated circuit according to the third embodiment is used, there is an advantage that an effect same as the above is obtained.

With the mask manufacturing method according to the fourteenth embodiment of the present invention, since the method of designing a semiconductor integrated circuit according to the third embodiment is used, there is an advantage that an effect same as the above is obtained.

With the apparatus for designing a semiconductor integrated circuit according to the fifteenth embodiment of the present invention, since the method of designing a semiconductor integrated circuit according to the fourth embodiment is used, there is an advantage that an effect same as the above is obtained.

With the recording medium according to the sixteenth embodiment of the present invention, since the method of designing a semiconductor integrated circuit according to the fourth embodiment is used, there is an advantage that an effect same as the above is obtained.

With the mask manufacturing method according to the seventeenth embodiment of the present invention, since the method of designing a semiconductor integrated circuit according to the fourth embodiment is used, there is an advantage that an effect same as the above is obtained.

BRIEF DESCRIPTION OF THE DRAWINGS

FIG. 1 is a flowchart for explaining a method of designing a semiconductor integrated circuit according to a first embodiment of the present invention;

FIG. 8 is a diagram showing a yield of products and for explaining a relation between a dimension and the number of errors after transfer of a pattern.

DESCRIPTION OF THE PREFERRED EMBODIMENTS

A method of designing a semiconductor integrated circuit according to a first embodiment of the present invention is explained with reference to a flowchart shown in FIG. 1.

As shown in FIG. 1, in a method of designing a semiconductor integrated circuit in generating a physical layout of a semiconductor integrated circuit from semiconductor integrated design data, in a "cell arranging and wiring step" S11, a designing apparatus arranges functional cells and wirings of a semiconductor integrated circuit to form a physical layout.

In a "design-rule checking step" S12, the designing apparatus verifies, with reference to rules for design rule check from a "rule library" 21, whether a second physical layout of a portion including the cells of the physical layout has a predetermined process margin. For example, the designing apparatus extracts, with reference to the "rule library" 21, a pattern having a sufficiently large process margin in the physical layout according to design rule check (DRC).

Figure 2A:
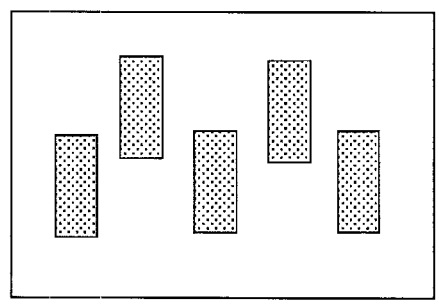
FIGS. 2A to 2D are pattern layout diagrams showing examples of an extracted pattern.
Figure 2B:
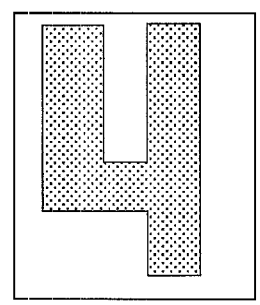
Figure 2C:
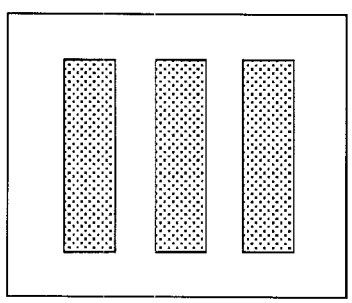
Figure 2D:
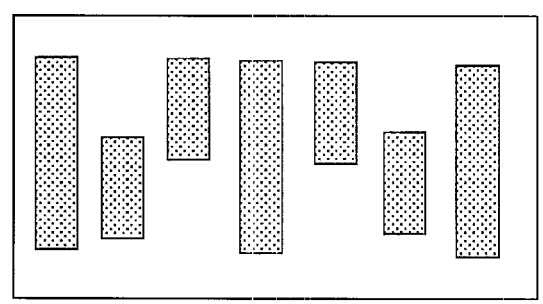

In this embodiment, design rules corresponding to, as a pattern having an enough process margin, for example, patterns such as an array of short line patterns shown in FIG. 2A, a pattern formed by connecting parts of line patterns arranged in parallel shown in FIG. 2B, an array of long line patterns shown in FIG. 2C, and an array of mixed long line patterns and short line patterns shown in FIG. 2D are used.

All the patterns shown in FIGS. 2A to 2D are patterns having an enough process margin. Therefore, for example, proximity correction and proximity correction verification are not performed.

As a result, when the second physical layout has the process margin in the "design-rule checking step" S12 ("Yes" in step S12), a pattern having a sufficiently large margin is extracted. Therefore, after performing the "design-rule checking step" S12, without performing processing following the step S12, the designing apparatus creates mask data corresponding to the physical layout using the second physical layout in a "mask-data creating step" S14.

On the other hand, when the second physical layout does not have the process margin in the "design-rule checking step" S12 ("No" in step S12), the designing apparatus performs a "mask-data processing step" S13.

In the "mask-data processing step" S13, for example, in a "proximity correction step" S13-1, the designing apparatus subjects the verification-object second physical layout to proximity correction.

In a "proximity-correction verifying step" S13-2, the designing apparatus verifies proximity correction of a pattern of the second physical layout subjected to the proximity correction.

Optical conditions for the proximity correction and the proximity correction verification, relaxed conditions for the proximity correction, and the like can be changed according to a layout to be processed.

In the "mask-data creating step" S14, the designing apparatus creates mask data corresponding to the physical layout using the second physical layout subjected to the "proximity-correction verifying step" S13-2.

In the "mask-data processing step" S13, when it is unnecessary to apply the proximity correction to data of the second physical layout, for example, when proximity correction processing is included in a processing flow after the creation of mask data, the designing apparatus performs the "proximity-correction verifying step" S13-2 without performing the "proximity correction step" S13-1.

The design rules used in this embodiment are set in various ways according to a process.

The process flow shown in FIG. 1 is an example of this embodiment. However, a process flow is not limited to that shown in FIG. 1 as long as it is possible to extract a pattern having a sufficiently large process margin and tape out mask data. For example, the designing apparatus may check design data using contrast of the design data, an MEEF (Mask Error Enhancement Factor), and a combination of the contrast and the MEEF instead of the design rules.

A method of designing a semiconductor integrated circuit according to a second embodiment of the present invention is explained with reference to a flowchart shown in FIG. 3.

Figure 3:
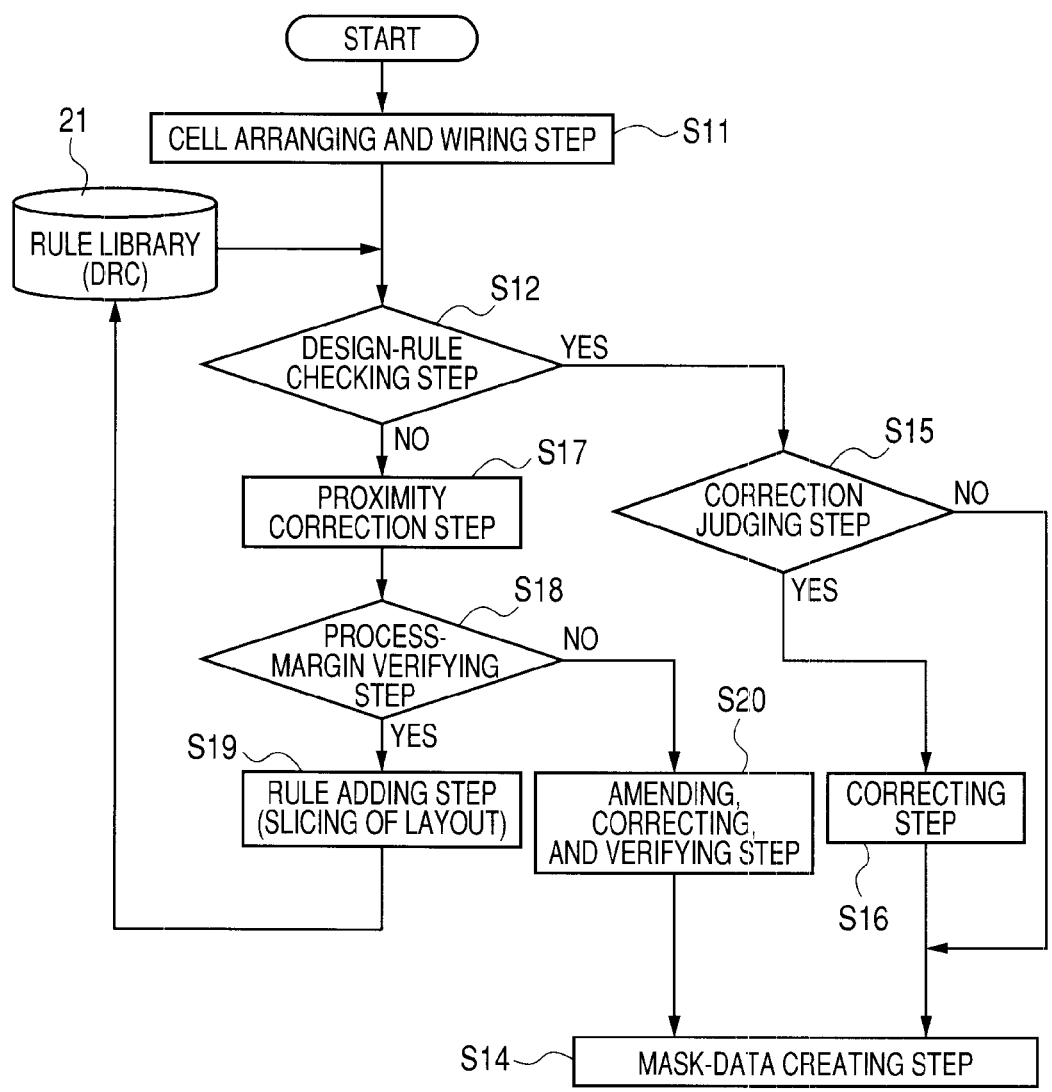
FIG. 3 is a flowchart for explaining a method of designing a semiconductor integrated circuit according to a second embodiment of the present invention.

As shown in FIG. 3, in a method of designing a semiconductor integrated circuit in creating a physical layout of a semiconductor integrated circuit from semiconductor integrated circuit design data, in a "cell arranging and wiring step" S11, a designing apparatus arranges functional cells and wirings of a semiconductor integrated circuit to form a physical layout.

In a "design-rule checking step" S12, the designing apparatus verifies, with reference to rules for design rule check from the "rule library" 21, whether a second physical layout of a portion including the cells of the physical layout has a predetermined process margin. For example, the designing apparatus pre-filters, with reference to the "rule library" 21, a pattern having a sufficiently large process margin of the physical layout according to design rule check (DRC).

As shown in Table 1, design rules (DRs) for products (when there is no formal design rules, tentative design rules are acceptable) are prepared. A bias determined in advance is added to the design rules to create design rules for matching. Table 1 shows rules for dimensions Lnm and spaces 5 nm of certain patterns represented by a pattern 1 and a pattern 2. When a certain pattern of a verification object layout satisfies conditions of dimensions of L and S, it is judged that a margin is large. In this embodiment, this bias is set to 30 nm. Design rule check (DRC) of the layout is performed on the basis of the DRs for matching.

TABLE 1

| Pattern 1 (nm) | Pattern 2 (nm) |
| --- | --- |
| L = 100, S ≧ 120 | L = 200, S ≧ 200 |
| L = 110, S ≧ 130 | L = 210, S ≧ 210 |
| L = 120, S ≧ 140 | L = 220, S ≧ 220 |
| L = 130, S ≧ 150 | L = 230, S ≧ 230 |
| L = 140, S ≧ 160 | L = 240, S ≧ 240 |

When the second physical layout has the process margin in the "design-rule checking step" S12 ("Yes" in step S12), in a "correction judging step" S13, the designing apparatus compares the process margin with a process margin specification determined in advance and judges whether the second physical layout having the margin should be corrected.

When it is judged in the "correction judging step" S13 that the correction is unnecessary ("No" in step S13), in a "mask-data creating step" S14, the designing apparatus creates mask data corresponding to the physical layout using the second physical layout for which it is judged that the correction is unnecessary.

When it is judged in the "correction judging step" S13 that the correction is necessary ("Yes" in step S13), in a "correcting step" S16, the designing apparatus corrects the judgment-object second physical layout. For example, the designing apparatus performs proximity correction (e.g., OPC) and proximity correction verification.

In the "mask-data creating step" S14, the designing apparatus creates mask data corresponding to the physical layout using the second physical layout corrected in the "correcting step" S16.

On the other hand, when the second physical layout does not have the process margin in the "design-rule checking step" S12 ("No" in step S12), in a "proximity correction step" S17, the designing apparatus subjects the verification-object second physical layout to the proximity correction.

In a "process-margin verifying step" S18, the designing apparatus verifies whether the second physical layout subjected to the proximity correction in the proximity correction step has a predetermined process margin.

When it is judged in the "process-margin verifying step" S18 that the second physical layout has the predetermined process margin ("Yes" in step S18), in a "rule adding step" S19, the designing apparatus extracts a judgment-object second physical layout and adds a rule of the second physical layout to the "rule library" 21.

On the other hand, when it is judged in the "process-margin verifying step" S18 that the second physical layout does not have the predetermined process margin ("No" in step S18), in an "amending, correcting, and verifying step" S20, the designing apparatus performs amendment, artwork, proximity correction, and proximity correction verification for a pattern of the judgment-object second physical layout.

In the "mask-data creating step" S14, the designing apparatus creates mask data corresponding to the physical layout using the second physical layout subjected to the "amending, correcting, and verifying step" S20.

When the pattern matching is performed in the "design-rule checking step" S12 again, "extraction of a pattern having a small margin", "proximity correction", "transfer simulation", and "layout amendment" performed in the past are omitted for an added pattern.

A rule library is obtained as described below.

Figure 4:
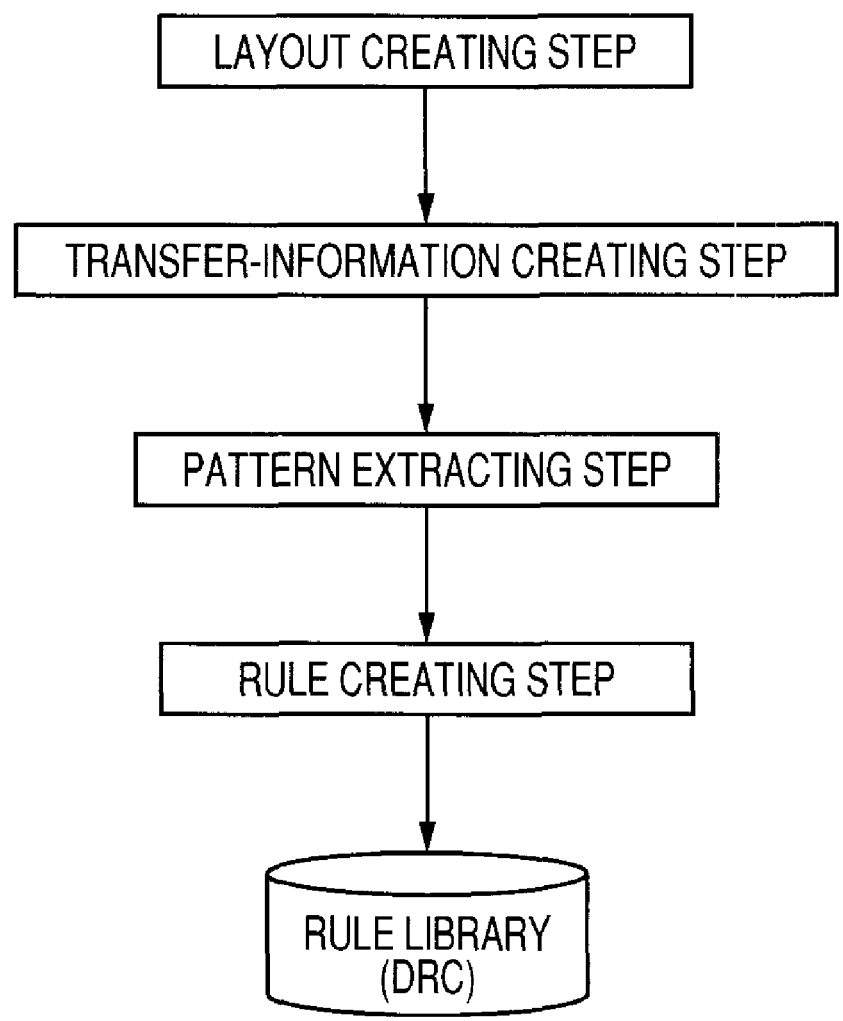
FIG. 4 is a flowchart for explaining an example of design rule check.

For example, as shown in a flowchart in FIG. 4, first, in a "layout creating step", the designing apparatus creates a first physical layout in which respective cells forming a physical layout are arranged and wired.

In a "transfer-information creating step", the designing apparatus performs a simulation for applying proximity correction to the first physical layout and transferring the physical layout onto a semiconductor substrate and creates transfer information.

In a "pattern extracting step", the designing apparatus extracts a pattern larger than a process margin of the first physical layout on the basis of the transfer information.

In a "rule creating step", the designing apparatus creates rules for the design rule check including information on the extracted pattern of the first physical layout and stores the created rules in the "rule library".

In this way, it is possible to extract a second physical layout and add a rule of the second physical layout to the rule library, relax conditions for optical proximity correction, relax conditions for lithography verification, relax conditions for optical proximity correction and exclude a pattern from an object of lithography verification, remove optical proximity correction and relax conditions for lithography verification, or exclude a pattern from an object of optical proximity correction and lithography verification. Consequently, a reduction in designing time for a semiconductor integrated circuit can be realized.

In the second embodiment, a bias for matching is set rather large. Therefore, all layouts written according to rules larger than the design rules shown in Table 1 are set outside a verification object area. In other words, the processing in the case of "Yes" as a result of "design rule check" is performed. Judgment on whether a layout should be set in the verification object area can also be adjusted by changing a bias applied to design rules in this way. Alternatively, it is also possible to perform screening only with the design rules and performing the transfer simulation again under relaxed conditions.

When a layout is sliced, an attribute of the layout is changed to distinguish the layout from other layouts. When verification is finished, the attribute is reset and the layout is taped out.

In the judgment on whether the second physical layout should be corrected in the "correction judging step" S13, when a design rule bias is large and the second physical layouts clearly has the process margin, the designing apparatus directly proceeds to the "mask-data creating step" S14. When a design rule bias is small, the designing apparatus proceeds to the "correcting step" S16 and, in the "correcting step" S16, performs the proximity correction and the proximity correction verification. It is possible to perform full-chip verification.

In the second embodiment, for example, when a design rule bias is equal to or larger than 10 nm, the designing apparatus directly proceeds to the "mask-data creating step" S14. When a design rule bias is smaller than 10 nm, the designing apparatus proceeds to the "correcting step" S16. A value of the design rule bias can be set without being limited to this value.

The design rules shown in Table 1 used in the second embodiment are excerpts from rules concerning a certain pattern. Design rules are not limited to this form and any design rules can be used.

In the second embodiment, the bias for creating design rules for matching is set to 30 nm. However, a value of the design rule bias is not limited to 30 nm and can be freely set.

When the "proximity correction step" S17 and the "process-margin verifying step" S18 are performed as a result of verification in the "design-rule checking step" S12, processing conditions can be set according to a purpose. For example, optical conditions for proximity correction and a transfer simulation of process margin check are set to an exposure wavelength 193 nm, NA=0.75, σ=0.85, and a ⅔ zone. On the other hand, an exposure amount is set to 13.5 mJ and fluctuated by a 0.5 mJ step at a time in the center. A defocus amount is calculated at a 0.05 μm step in a range of ±0.2 μm. Target values of a dosage and a setting amount of a focus condition are set to a line and space of 100 nm. Proximity correction (OPC) processing is included in the "correcting step" S16 of the processing flow after tape-out. However, the proximity correction processing may be applied or may not be applied. In the "amending, correcting, and verifying step" S20, although not shown in the figure, tape-out is included between artwork and proximity correction. The proximity correction (OPC) processing after this tape-out may be applied or may not be applied.

Optical conditions for proximity correction, process margin check, and proximity correction verification, relaxation conditions for proximity correction, and the like are not limited to the method according to this embodiment and can be changed according to a layout to be processed.

The respective conditions are applicable to various conditions from a product initiation period until process conditions mature. Moreover, in performing the processing according to this embodiment, priority of processing may be set by taking into account electric characteristics. In other words, it is also possible to typically apply a transfer simulation to a portion corresponding to a critical path of a circuit and apply normal verification processing to other areas.

In the method of designing a semiconductor integrated circuit according to the second embodiment, the design-rule checking step after the cell arranging and wiring step is performed in a full-chip size and conditions for proximity correction and proximity correction verification are relaxed for a pattern having an enough margin or the pattern is excluded from a verification object. Therefore, by making use of work of proximity correction and process margin verification in the past performed in advance when a library and a database for pattern matching are created and, on the other hand, excluding a pattern for which verification is unnecessary from a processing flow, it is possible to realize efficiency of processing.

Even if the verification object is omitted from the database and the library, since a pattern having an enough margin from the beginning is extracted, the pattern is simply set as an object of normal processing.

Therefore, there is an advantage that it is possible to reduce a load of a library for pattern matching. Since data of full-chip processing is reduced and verification of a pattern having an enough margin is excluded, there is an advantage that it is possible to reduce a total processing load and simplify designing of a semiconductor integrated circuit without deteriorating screening accuracy.

A method of designing a semiconductor integrated circuit according to a third embodiment of the present invention is explained with reference to a flowchart shown in FIG. 5.

Figure 5:
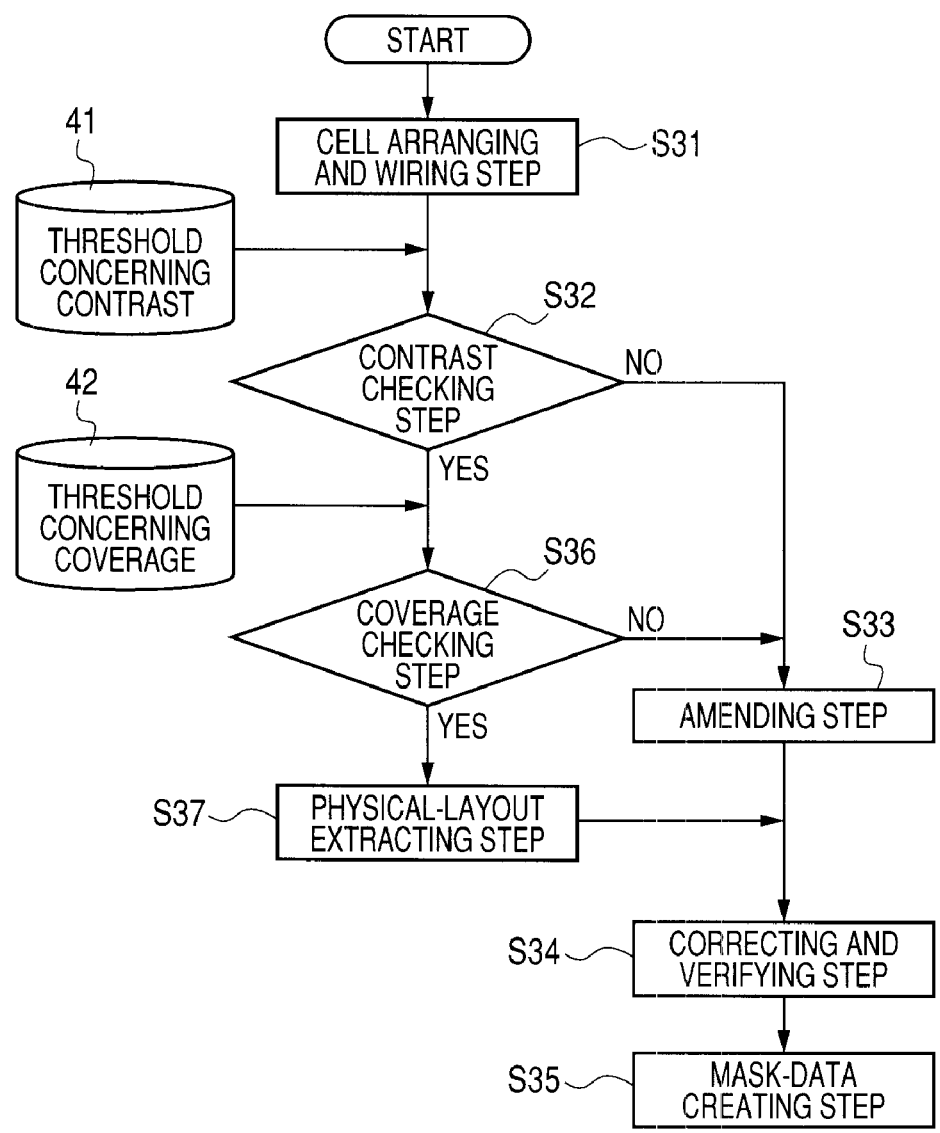
FIG. 5 is a flowchart for explaining a method of designing a semiconductor integrated circuit according to a third embodiment of the present invention.

As shown in FIG. 5, in a method of designing a semiconductor integrated circuit in creating a physical layout of a semiconductor integrated circuit from semiconductor integrated circuit design data, in a "cell arranging and wiring step" S31, a designing apparatus arranges functional cells and wirings of a semiconductor integrated circuit to form a physical layout.

In a "contrast checking step" S32, the designing apparatus calculates contrast of the layout and compares, with reference to a "threshold concerning contrast" 41 of an image on a semiconductor substrate of a layout obtained by arranging and wiring the respective cells, the threshold 41 with a result of the calculation of contrast. For example, in the "contrast checking step" S32, the designing apparatus calculates slope of an optical image for each edge of a pattern and extracts a pattern surrounded by specifications of contrast determined in advance, for example, slope values larger than 55.

When a result of the calculation of contrast is equal to or lower than the threshold concerning contrast in the "contrast checking step" S32 ("No" in step S32), in an "amending step" S33, the designing apparatus performs acquisition of transfer information of an area where the contrast is equal to or lower than the threshold, amendment of a physical layout of the area, and artwork processing.

Subsequently, in a "correcting and verifying step" S34, the designing apparatus applies proximity correction and proximity correction verification to the physical layout subjected to the amending step.

In a "mask-data creating step" S35, the designing apparatus creates mask data using the physical layout subjected to the "correcting and verifying step" S34.

When the result of the calculation of contrast is larger than the threshold concerning contrast in the "contrast checking step" S32 ("Yes" in step S32), in a "coverage checking step" S36, the designing apparatus compares, with reference to a "threshold concerning coverage" 42 of the physical layout, the threshold 42 with information concerning coverage of the obtained layout. For example, the designing apparatus extracts a layout portion having a slope value larger than a value determined in advance and having coverage larger than a coverage specification value (e.g., 45%) determined in advance.

When the information concerning the coverage satisfies the threshold concerning the coverage in the "coverage checking step" S36 ("Yes" in step S36), in a "layout extracting step" S37, the designing apparatus extracts a judgment-object physical layout.

The designing apparatus applies the "correcting and verifying step" S34 and the subsequent steps to the physical layout obtained in the layout extracting step. In this case, the designing apparatus can apply, with relaxed conditions for proximity correction (e.g., OPC) and proximity correction (e.g., OPC) verification, the processing to a pattern extracted according to a combination of a slope value and coverage.

When the information concerning the coverage does not satisfy the threshold concerning the coverage in the "coverage checking step" S36 ("No" in step S36), the designing apparatus performs the "amending step" S33 and the subsequent steps.

In the third embodiment, since the proximity correction (OPC) processing is omitted, processing time is not long. However, in extracting a physical layout, a transfer simulation is not performed by using mask data after the proximity correction (OPC). Therefore, the designing apparatus performs the proximity correction (OPC) and the proximity correction (OPC) verification in the "correcting and verifying step" S34 without omitting the step and determines processing conditions for the "correcting and verifying step" S34 on the basis of a result of the verification in the "contrast checking step" S32 and the "coverage checking step" S36.

On the other hand, concerning a pattern that does not satisfy the specifications in the "contrast checking step" S32 or the "coverage checking step" S36, in the "amending step" S33, the designing apparatus performs reprocessing of acquisition of transfer information of an area where contrast is equal to or lower than the threshold, amendment of a physical layout of the area, artwork processing, and the like.

By performing contrast check and coverage check in this way, it is possible to relax conditions for optical proximity correction, relax conditions for lithography verification, relax conditions for optical proximity correction and exclude a pattern from an object of lithography verification, remove the optical proximity correction and relax conditions for lithography verification, or exclude a pattern from an object of optical proximity correction and lithography verification. Consequently, a reduction in design time for a semiconductor integrated circuit can be realized.

Figure 6A:
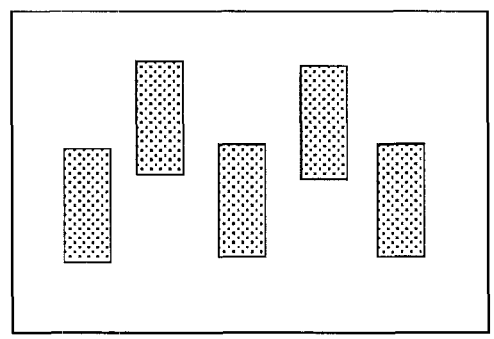
FIGS. 6A to 6D are pattern layout diagrams showing examples of a pattern extracted on the basis of slope and coverage.
Figure 6B:
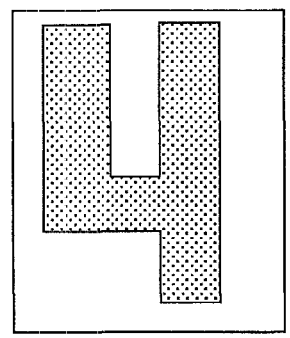
Figure 6C:
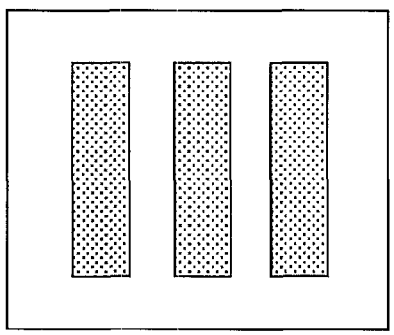
Figure 6D:
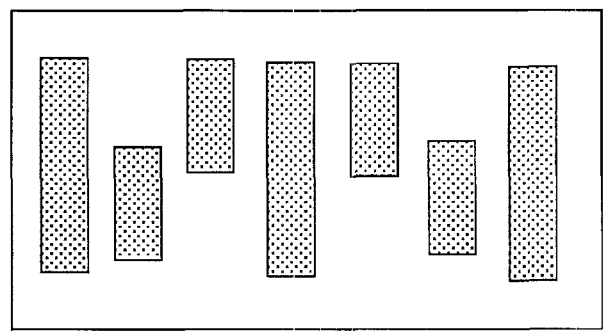

Examples of a pattern extracted on the basis of slope and coverage are shown in FIGS. 6A to 6D. As examples, an array of short line patterns shown in FIG. 6A, a pattern formed by connecting parts of line patterns arranged in parallel shown in FIG. 6B, an array of long line patterns shown in FIG. 6C, and an array of mixed long line patterns and short line patterns shown in FIG. 6D are extracted.

All the patterns shown in FIGS. 6A to 6D are patterns having sufficiently large process margins as a result of a transfer simulation. Therefore, the proximity correction and the proximity correction verification can be performed under relaxed conditions of tolerance of verification, the number of times of iteration of proximity correction, and the like.

As an example, optical conditions for proximity correction and a transfer simulation of process margin check are set to an exposure wavelength 193 nm, NA=0.75, σ=0.85, and a ⅔ zone. On the other hand, an exposure amount is set to 13.5 mJ and fluctuated by a 0.5 mJ step at a time in the center. A defocus amount is calculated at a 0.05 μm step in a range of ±0.2 μm.

Target values of a dosage and a setting amount of a focus condition are set to, for example, a line and space of 100 nm.

The proximity correction processing is included in the processing flow after tape-out. However, the proximity correction processing may be applied or may not be applied.

Optical conditions for proximity correction, process margin check, and proximity correction verification, relaxation conditions for proximity correction, and the like are not limited to the conditions described above and can be changed according to a layout to be processed.

In the third embodiment, a value of slope equal to or higher than 55 and coverage equal to or higher than 45% are extraction conditions. However, extraction conditions are not limited to these conditions and can be appropriately set. Conditions for extraction is not limited to slope and coverage. A pattern may be extracted according to, for example, a combination of slope and coverage with a CD (critical dimension) value. Optical conditions for proximity correction and proximity correction verification, relaxation conditions for proximity correction, and the like can be changed according to a layout to be processed.

These conditions are applicable to various conditions from a product initiation period until process conditions mature. Moreover, in performing the processing according to this embodiment, priority of processing may be set by taking into account electric characteristics. In other words, it is also possible to typically apply a transfer simulation to a portion corresponding to a critical path of a circuit and apply normal verification processing to other areas.

In the method of designing a semiconductor integrated circuit according to the second embodiment, the contrast checking step after the cell arranging and wiring step is performed in a full-chip size and conditions for proximity correction are relaxed for a pattern having an enough margin or the pattern is excluded from a verification object. Therefore, by making use of work of proximity correction and lithography verification in the past performed in advance when a library and a database for pattern matching are created and, on the other hand, excluding a pattern for which verification is unnecessary from a processing flow, it is possible to realize efficiency of processing.

Even if the verification object is omitted from the database and the library, since a pattern having an enough margin from the beginning is extracted, the pattern is simply set as an object of normal processing.

Therefore, there is an advantage that it is possible to simplify designing of a semiconductor integrated circuit without deteriorating screening accuracy. Since library creation is not performed, there is an advantage that it is possible to reduce a load of library creation compared with the method of designing a semiconductor integrated circuit according to the second embodiment of the present invention.

A method of designing a semiconductor integrated circuit according to a fourth embodiment of the present invention is explained with reference to a flowchart shown in FIG. 7.

Figure 7:
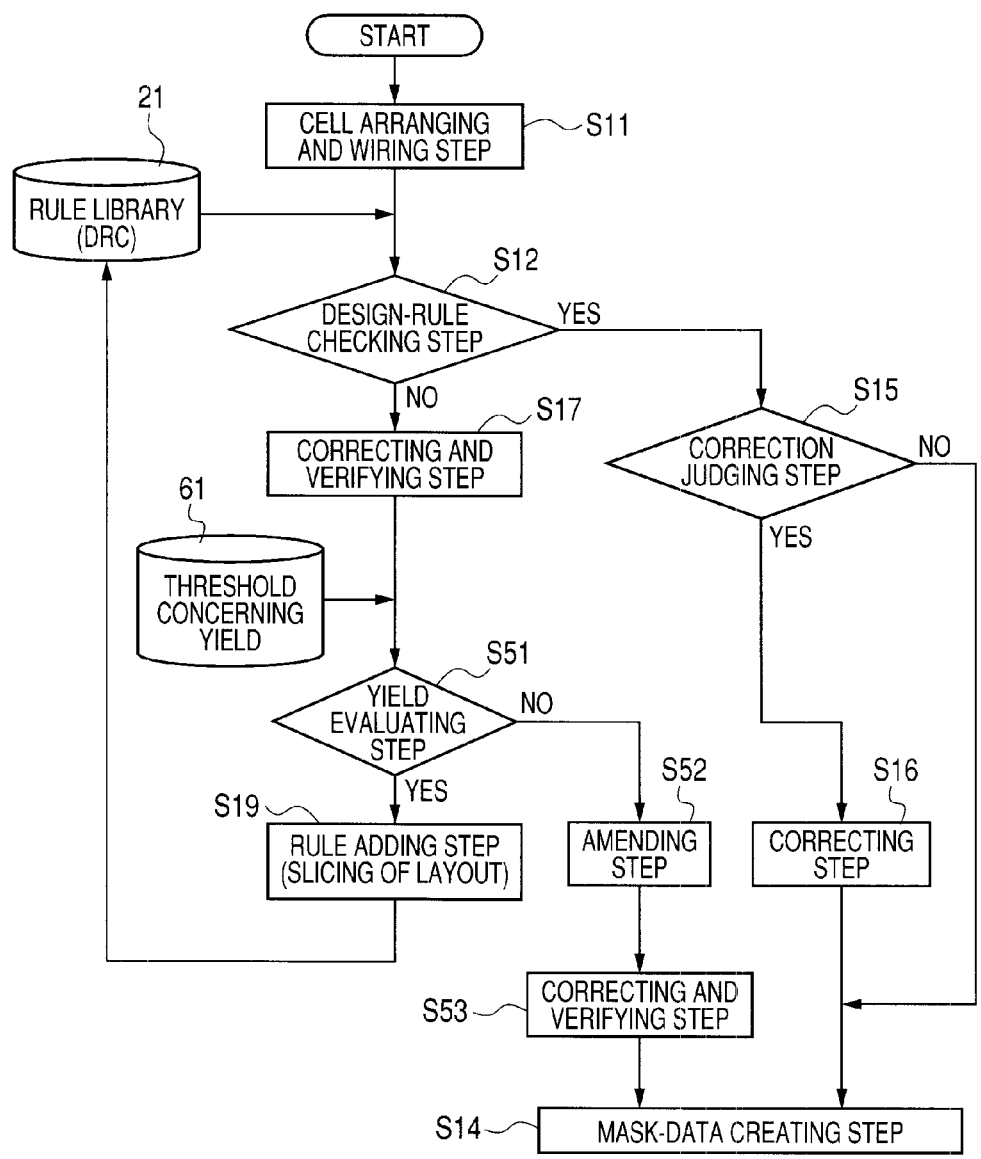
FIG. 7 is a flowchart for explaining a method of designing a semiconductor integrated circuit according to a fourth embodiment of the present invention.

As shown in FIG. 7, in a method of designing a semiconductor integrated circuit in creating a physical layout of a semiconductor integrated circuit from semiconductor integrated circuit design data, in a "cell arranging and wiring step", a designing apparatus arranges functional cells and wirings of a semiconductor integrated circuit to form a physical layout.

In a "design-rule checking step" S12, the designing apparatus verifies, with reference to rules for design rule check from the "rule library" 21, whether a second physical layout of a portion including the cells of the physical layout has a predetermined process margin. For example, the designing apparatus pre-filters, with reference to the "rule library" 21, a pattern having a sufficiently large process margin of the physical layout according to design rule check (DRC).

As shown in Table 1, design rules (DRs) for products (when there is no formal design rules, tentative design rules are acceptable) are prepared. A bias determined in advance is added to the design rules to create design rules for matching. Table 1 shows rules for dimensions Lnm and spaces 5 nm of certain patterns represented by a pattern 1 and a pattern 2. When a certain pattern of a verification object layout satisfies conditions of dimensions of L and S, it is judged that a margin is large. In this embodiment, this bias is set to 30 nm. Design rule check (DRC) of the layout is performed on the basis of the DRs for matching.

When the second physical layout has the process margin in the "design-rule checking step" S12 ("Yes" in step S12), in a "correction judging step" S13, the designing apparatus compares the process margin with a process margin specification determined in advance and judges whether the second physical layout having the margin should be corrected.

On the other hand, when the information concerning a yield does not satisfy the threshold concerning a yield in the "yield evaluating step" S51 ("No" at step S51), in an "amending step" S52, the designing apparatus performs acquisition of transfer information of an area where a yield is equal to or lower than the threshold, amendment of a second physical layout of the area, and artwork processing.

In a "correcting and verifying step" S53, the designing apparatus applies proximity correction and proximity correction verification to the second physical layout subjected to the "amending step" S52.

In the "mask-data creating step" S14, the designing apparatus creates mask data corresponding to the physical layout using the second physical layout subjected to the "correcting and verifying step" S53.

A yield evaluation value in the "yield evaluating step" S51 can be calculated by convoluting, as shown in FIG. 8, a probability density calculated on the basis of values of exposure amount variation and defocus amount variation of an exposure device, for example, as shown in Table 2 with a function of the measured number of errors.

TABLE 2

| Dose | defocus (μm) | | | | | | | | |
|---|---|---|---|---|---|---|---|---|---|
| (%) | Defocus 4 | Defocus 3 | Defocus 2 | Defocus 1 | Defocus 0 | Defocus 1 | Defocus 2 | Defocus 3 | Defocus 4 |
| Dose 1 | 0.063312 | 0.573729721 | 2.054255182 | 4.41593444 | 5.699175434 | 4.41593444 | 2.054255182 | 0.573729721 | 0.06331212 |
| Dose 2 | 3.76E−12 | 3.4380E−11 | 1.22035E−10 | 2.62333E−10 | 3.38565E−10 | 2.62333E−10 | 1.22035E−10 | 3.4083E−11 | 3.76112E−12 |
| Dose 3 | 6.51E−05 | 0.000589901 | 0.002112156 | 0.004540402 | 0.005859812 | 0.004540402 | 0.002112156 | 0.000589901 | 6.50966E−05 |
| Dose 4 | 0.016839 | 0.152590029 | 0.546352831 | 1.174468637 | 1.515761363 | 1.174468637 | 0.546352831 | 0.152590029 | 0.016838588 |
| Dose 5 | 6.51E−05 | 0.000589901 | 0.002112156 | 0.004540402 | 0.005859812 | 0.004540402 | 0.002112156 | 0.000589901 | 6.50966E−05 |

When it is judged in the "correction judging step" S13 that the correction is unnecessary ("No" in step S13), in a "mask-data creating step" S14, the designing apparatus creates mask data corresponding to the physical layout using the second physical layout for which it is judged that the correction is unnecessary.

When it is judged in the "correction judging step" S13 that the correction is necessary ("Yes" in step S13), in a "correcting step" S16, the designing apparatus corrects the judgment-object second physical layout. For example, the designing apparatus performs proximity correction (e.g., OPC) and proximity correction verification.

In the "mask-data creating step" S14, the designing apparatus creates mask data corresponding to the physical layout using the second physical layout corrected in the "correcting step" S16.

On the other hand, when the second physical layout does not have the process margin in the "design-rule checking step" S12 ("No" in step S12), in a "correcting and verifying step" S17, the designing apparatus subjects the verification-object second physical layout to the proximity correction and the proximity correction verification.

In a "yield evaluating step" S51, the designing apparatus compares, with reference to a "threshold concerning a yield" 61 of the second physical layout, the threshold 61 with information concerning a yield of the second physical layout.

When the information concerning a yield satisfies the threshold concerning a yield in the "yield evaluating step" S51 ("Yes" at step S51), in a "rule adding step" S19, the designing apparatus extracts a judgment-object second physical layout and adds a rule of the second physical layout to the "rule library" 21.

A result of the convolution is shown in Table 3.

TABLE 3

| CD Classification | Probability Density | Yield Loss Ratio (%) |
|---|---|---|
| 1 | 0.000589901 | 0.05899009 |
| 2 | 3.38565E−10 | 3.38565E−8 |
| 3 | 0.152590029 | 0.076295014 |
| 4 | 0.002112157 | 0.000105608 |
| 5 | 0.000589901 | 0 |
| 6 | 0.556753046 | 0 |
| 7 | 2.702742371 | 0 |

As shown in Table 3, the left space represents a probability density corresponding to a dimension value of a pattern formed on a wafer when a certain pattern is exposed to light under exposure conditions in a range of set exposure amounts and defocus amounts. The right space represents a result obtained by convoluting the function of the number of errors shown in FIG. 8 in association with the probability density in the left space. This is equivalent to a defect probability of a yield. Therefore, it is possible to perform the judgment in the processing using a value of the defect probability.

In general, a probability density is represented as Equation (3):

$$P(a \leq X \leq b) = \int_a^b f(x) dx \quad (3)$$

P in Equation (3) represents a probability that X is consecutive and put between sections "a" and "b". Then, when ƒ(x) given by Equation (3) is a probability density function, a certain bivariate function f(x,y) is as indicated by Equation (4).

$$P(a \le X \le b, c \le Y \le d) = \int_a^b \int_c^d f(x, y)\,dx\,dy \qquad (4)$$

Then, f(x,y) is a joint density function of a two-dimensional probability variable (X,Y) and can be represented as Equation (5).

$$f(x, y) \ge 0, \quad \int_{-\infty}^{\infty}\int_{-\infty}^{\infty} f(x, y)\,dx\,dy = 1 \qquad (5)$$

A probability density of simultaneous occurrence of a probability density function f(x) of a certain exposure amount and a probability density function f(y) of a certain defocus amount is given by the product of f(x) and f(y). Therefore, for example, probability densities were calculated with exposure amount variation of an exposure device, which processed products, set to 1.5% and defocus variation of the exposure device set to 0.18%, the product of the respective probability densities was calculated, and a probability density in the case of a certain exposure amount and a certain defocus amount was calculated. Further, a probability density was calculated taking into account machining variation and assembly variation. An example of a result of the calculation is shown in Table 2. The function shown in FIG. 8 is a function indicating a yield of products. The abscissa indicates a dimension (e.g., a line width) after transfer of a certain pattern and the ordinate indicates a yield as the number of errors.

On the other hand, as shown in Table 3, line widths of patterns in the case of exposure under conditions of combinations of the respective exposure amounts and defocus amounts were calculated, yield evaluation values corresponding to the line widths and a threshold of a yield evaluation value determined in advance were compared to extract a pattern.

In the fourth embodiment, a pattern having the defect probability smaller than 0.1% is extracted. Proximity correction and proximity correction verification after tape-out of the extracted pattern are performed under relaxed conditions or processing of proximity correction and proximity correction verification is regarded as finished.

Optical conditions for proximity correction and a transfer simulation of process margin check in design rule check are set to, as an example, an exposure wave length 193 nm, NA=0.75, σ=0.85, and a ⅔ zone. On the other hand, an exposure amount is set to 13.5 mJ and fluctuated by a 0.5 mJ step at a time in the center. A defocus amount is calculated at a 0.05 μm step in a range of ±0.2 μm. Target values of a dosage and a setting amount of a focus condition are set to a line and space of 100 nm.

Proximity correction processing is included in the processing flow after tape-out. However, proximity correction processing may be applied or may not be applied. Optical conditions for proximity correction, process margin check in design rule check, and proximity correction verification, relaxed conditions for proximity correction, and the like can be changed according to a layout to be processed.

In the fourth embodiment, variation in the exposure device is assumed, a variation function of the variation is assumed to calculate a probability density, and a yield evaluation value is calculated by using convolution of the probability density with a measured value. However, it is also possible to simply multiply calculated respective probability densities with 1 when a yield is step-functionally 100% and with 0 when a yield is step-functionally 0%. Various functions for realizing the variation, the variation function, and the measured value can be set.

Variation ranges of the exposure amount and the defocus amount shown in Table 3 are not limited to the ranges described herein.

Optical conditions for proximity correction, process margin check, and proximity correction verification and relaxed conditions for proximity correction according to the fourth embodiment are applicable to various conditions from a product initiation period until process conditions mature. Moreover, in performing the processing according to the fourth embodiment, priority of processing may be set by taking into account electric characteristics.

In other words, it is also possible to typically apply a transfer simulation to a portion corresponding to a critical path of a circuit and apply normal verification processing to other areas.

A rule library can be obtained in the same manner as that in the second embodiment.

In the fourth embodiment, by extracting a second physical layout and adding a rule of the second physical layout in a rule library, it is possible to relax conditions for optical proximity correction, relax conditions for lithography verification, relax conditions for optical proximity correction and exclude a pattern from an object of lithography verification, remove the optical proximity correction and relax conditions for lithography verification, or exclude a pattern from an object of optical proximity correction and lithography verification. Consequently, a reduction in design time for a semiconductor integrated circuit can be realized.

In the method of designing a semiconductor integrated circuit according to the fourth embodiment, the design-rule checking step after the cell arranging and wiring step is performed in a full-chip size and conditions for proximity correction and proximity correction verification are relaxed for a pattern having an enough margin or the pattern is excluded from a verification object. Therefore, by making use of work of proximity correction and process margin verification in the past performed in advance when a library and a database for pattern matching are created and, on the other hand, excluding a pattern for which verification is unnecessary from a processing flow, it is possible to realize efficiency of processing.

Even if the verification object is omitted from the database and the library, since a pattern having an enough margin from the beginning is extracted, the pattern is simply set as an object of normal processing.

Since screening of a layout is performed by using a yield evaluation value, there is an advantage that it is possible to judge all kinds of processing in terms of an yield, judge that a yield only has to be secured even if a process margin is small, and realize efficiency and simplification of an overall design flow without deteriorating screening accuracy in different viewpoints.

In the fourth embodiment, rules for layout extraction are created on the basis of a result of a transfer simulation, an object layout is selected by using the rules, and the layout is judged according to a yield evaluation value. However, screening according to the rules is not always necessary. Screening may be directly performed by using the yield evaluation value. This screening is explained below as a fifth embodiment of the present invention.

In a method of designing a semiconductor integrated circuit in creating a physical layout of a semiconductor integrated circuit from semiconductor integrated circuit design data, a designing apparatus performs the "cell arranging and wiring step" and, without performing the "design-rule checking step", performs a yield evaluating step of comparing, with reference to a "threshold concerning a yield" of a second physical layout of a portion including cells of a physical layout, the threshold with information concerning a yield of the second physical layout. When the information concerning a yield satisfies the threshold concerning a yield in this "yield evaluating step", in a "layout extracting step", the designing apparatus extracts a judgment-object physical layout. In a "correcting and verifying step", the designing apparatus applies proximity correction and proximity correction verification to the physical layout obtained in the "layout extracting step".

On the other hand, when the information concerning a yield does not satisfy the threshold concerning a yield in the "yield evaluating step", in an "amending step", the designing apparatus performs acquisition of transfer information of an area where a yield is equal to or lower than the threshold, amendment of a second physical layout in the area, and artwork processing. In a "correcting and verifying step", the designing apparatus applies the proximity correction and the proximity correction verification to the second physical layout subjected to the "amending step". Thereafter, in a "mask-data creating step", the designing apparatus creates mask data using the second physical layout subjected to the "correcting and verifying step".

A rule library can be obtained in the same manner as that in the second embodiment.

With the method of designing a semiconductor integrated circuit according to the fifth embodiment, since the "yield evaluating step" of comparing, with reference to a threshold concerning a yield of a second physical layout, the threshold with a "threshold concerning a yield", which is information concerning a yield of the second physical layout, is provided, a reduction in design time for a semiconductor integrated circuit can be realized.

Since pattern matching in the past is basically matching processing for two-dimensional figures, a processing load is heavy. However, design rule check in the respective embodiments explained above is graphical operation processing, which is the same as mask data processing. Therefore, since a processing load is reduced compared with the processing by pattern matching in the past, there is an advantage that processing speed can be improved.

The methods of designing a semiconductor integrated circuit according to the first to fifth embodiments can be applied to a designing apparatus for carrying out a method of designing a semiconductor integrated circuit in creating a physical layout of a semiconductor integrated circuit from semiconductor integrated circuit design data.

The methods of designing a semiconductor integrated circuit can be applied to a recording medium having recorded therein a method of designing a semiconductor integrated circuit in creating a physical layout of a semiconductor integrated circuit from semiconductor integrated circuit design data.

Moreover, the methods of designing a semiconductor integrated circuit can be applied to a mask manufacturing method for manufacturing a mask using a method of designing a semiconductor integrated circuit in creating a physical layout of a semiconductor integrated circuit from semiconductor integrated circuit design data.

It should be understood by those skilled in the art that various modifications, combinations, sub-combinations, and alterations may occur depending on design requirements and other factors insofar as they are within the scope of the appended claims or the equivalents thereof.

What is claimed is:

1. A method of designing a semiconductor integrated circuit in creating a physical layout of the semiconductor integrated circuit from semiconductor integrated circuit design data using a designing apparatus, the method comprising the steps of:
   virtually arranging and wiring, with the designing apparatus, cells to create the physical layout;
   verifying, with the designing apparatus, compliance with a design rule by comparing a shape of a second physical layout including the cells of the physical layout against a rule library;
   creating, with the designing apparatus, mask data corresponding to the physical layout using the second physical layout when the design rule is satisfied in the verifying step;
   performing, with the designing apparatus, only when the design rule is not satisfied in the verifying step, mask data processing for the second physical layout; and
   creating, with the designing apparatus, mask data corresponding to the physical layout using the second physical layout subjected to the mask data processing in the mask-data processing step.

2. The method of claim 1, wherein the mask-data processing step includes the steps of:
   performing proximity correction for the second physical layout; and
   verifying the second physical layout subjected to the proximity correction.

3. A method of designing a semiconductor integrated circuit in creating a physical layout of the semiconductor integrated circuit from semiconductor integrated circuit design data using a designing apparatus, the method comprising the steps of:
   virtually arranging and wiring, with the designing apparatus, cells to create the physical layout;
   verifying, with the designing apparatus, compliance with a design rule by comparing a shape of a second physical layout including the cells of the physical layout against a rule library;
   judging, with the designing apparatus, whether proximity correction is applied to the second physical layout that satisfies the design rule in the verifying step;
   creating, with the designing apparatus, when it is judged in the correction judging step that the correction is unnecessary, mask data corresponding to the physical layout using the second physical layout for which it is judged that the correction is unnecessary;
   applying, with the designing apparatus, when it is judged in the correction judging step that the correction is necessary, proximity correction to the judgment-object second physical layout;
   creating, with the designing apparatus, mask data corresponding to the physical layout using the second physical layout corrected in the step of applying proximity correction;
   applying, with the designing apparatus, when the design rule is not satisfied in the verifying step, proximity correction to the verification-object second physical layout;

verifying, with the designing apparatus, whether the second physical layout subjected to the proximity correction in the proximity correction step has a predetermined process margin;

extracting, with the designing apparatus, when it is judged in the process-margin verifying step that the second physical layout has the process margin, a judgment-object second physical layout, adding a rule of the second physical layout to the rule library, and creating mask data of the physical layout corresponding to the second physical layout;

performing, with the designing apparatus, when it is judged in the process-margin verifying step that the second physical layout does not have the process margin, correction, artwork, proximity correction, and proximity correction verification for a pattern of the judgment-object second physical layout; and creating, with the designing apparatus, mask data corresponding to the physical layout using the second physical layout subjected to the step of performing correction, artwork, proximity correction, and proximity correction verification.

4. The method of claim 2, further comprising the steps of:
creating a first physical layout in which respective cells forming the physical layout are arranged and wired;
performing a simulation for applying proximity correction to the first physical layout to transfer the first physical layout onto a semiconductor substrate and creating transfer information;
extracting a pattern larger than a predetermined process margin of the first physical layout on the basis of the transfer information; and
creating a rule for the design rule check including information on the extracted pattern of the first physical layout and storing the created rule in the rule library.

5. The method of claim 2, wherein the rule is a design rule concerning a dimension and a space of a pattern included in the first physical layout and a rule obtained by adding or subtracting a bias to and from the design rule.

6. The method of claim 2, wherein, in the correction judging step, it is judged whether proximity correction and verification of the proximity correction should be performed as a following correction step.

7. The method of claim 4, wherein the pattern extracting step includes the steps of:
selecting a threshold concerning a process margin of the second physical layout; and
extracting a pattern having a large process margin of the first physical layout from the threshold, the transfer information, and the rule, and
the second physical layout is verified with reference to the extracted first physical layout.

8. The method of claim 3, wherein the extraction of a second physical layout includes changing an attribute of the layout and creating a small area layout including a layout to be extracted.

9. A method of designing a semiconductor integrated circuit in creating a physical layout of the semiconductor integrated circuit from semiconductor integrated circuit design data using a designing apparatus, the method comprising the steps of:
virtually arranging and wiring, with the designing apparatus, cells to create the physical layout;
setting, with the designing apparatus, thresholds concerning contrast and coverage of an image on a semiconductor substrate;
calculating, with the designing apparatus contrast of the physical layout and comparing, with reference to the threshold concerning contrast of a layout obtained by arranging and wiring the respective cells, the threshold with a result of the calculation of contrast;
performing, with the designing apparatus, when the result of the calculation of contrast is equal to or lower than the threshold concerning contrast in the step of comparing a threshold and contrast, acquisition of transfer information of an area where the contrast is equal to or lower than the threshold, amendment of a physical layout of the area, and artwork processing;
applying, with the designing apparatus, proximity correction and proximity correction verification to the physical layout subjected to the step of performing acquisition of transfer information, amendment of a physical information, and artwork processing;
creating, with the designing apparatus, mask data using the physical layout subjected to the step of applying proximity correction and proximity correction verification;
comparing, with the designing apparatus, when a result of the calculation of contrast of the layout is larger than the threshold concerning contrast in the step of comparing a threshold and contrast, with reference to the threshold concerning coverage of the physical layout, the threshold with information concerning coverage of the obtained layout; and
extracting, with the designing apparatus, when the information concerning the coverage satisfies the threshold concerning coverage in the step of comparing the threshold with the information concerning coverage of the obtained layout, a judgment-object physical layout, wherein,
the step of applying proximity correction and proximity correction verification and the subsequent steps are applied to the physical layout obtained in the layout extracting step, and
when the information concerning coverage does not satisfy the threshold concerning coverage in the step of comparing the threshold with the information concerning coverage of the obtained layout, the step of performing acquisition of transfer information, amendment of a physical information, and artwork processing, the step of applying proximity correction and proximity correction verification, and the subsequent steps for the physical layout are performed.

10. The method of claim 9, wherein the threshold of contrast is calculated by evaluating a layout of an object generation in advance or an empirical value is used as the threshold.

11. The method of claim 9, wherein the information concerning contrast is single differentiation of optical intensity of an optical image.

12. The method of claim 9, wherein the extraction of a physical layout includes changing an attribute of the layout and creating a small area layout including a layout to be extracted.

13. A method of designing a semiconductor integrated circuit in creating a physical layout of the semiconductor integrated circuit from semiconductor integrated circuit design data using a designing apparatus, the method comprising the steps of:
virtually arranging and wiring, with the designing apparatus, cells to create the physical layout;
verifying, with the designing apparatus, with reference to a rule library for design rule check, whether a second physical layout of a portion including the cells of the physical layout has a predetermined process margin;

judging, with the designing apparatus, when the second physical layout has the process margin in the step of verifying whether a second physical layout has a predetermined process margin, whether the second physical layout having the margin should be subjected to proximity correction;

creating, with the designing apparatus, when it is judged in the correction judging step that the correction is unnecessary, mask data corresponding to the physical layout using the second physical layout for which it is judged that the correction is unnecessary;

subjecting, with the designing apparatus, when it is judged in the correction judging step that the correction is necessary, the judgment-object second physical layout to proximity correction and proximity correction verification;

creating mask data corresponding to the physical layout using the second physical layout subjected to the proximity correction and the proximity correction verification in the step of subjecting the second physical layout to proximity correction and proximity correction verification;

subjecting, with the designing apparatus, when the second physical layout does not have the process margin in the step of verifying whether a second physical layout has a predetermined process margin, the verification-object second physical layout to proximity correction and proximity correction verification;

comparing, with the designing apparatus, with reference to a threshold concerning a yield of the second physical layout, the threshold with information concerning a yield of the second physical layout, extracting, with the designing apparatus, when the information concerning a yield satisfies the threshold concerning a yield in the step of comparing the threshold with the information concerning a yield, a judgment-object second physical layout, and adding a rule of the second physical layout to the rule library;

performing, with the designing apparatus, when the information concerning a yield does not satisfy the threshold concerning a yield in the step of comparing the threshold with the information concerning a yield, acquisition of transfer information of an area where the yield is equal to or lower than the threshold, amendment of a second physical layout of the area, and artwork processing;

applying, with the designing apparatus, proximity correction and proximity correction verification to the second physical layout subjected to the step of performing acquisition of transfer information, amendment of a second physical information, and artwork processing; and creating, with the designing apparatus, mask data using the second physical layout subjected to the step of applying proximity correction and proximity correction verification.

14. The method of claim 13, further comprising the steps of:

creating a first physical layout in which respective cells forming the physical layout are arranged and wired;

performing a simulation for applying proximity correction to the first physical layout to transfer the first physical layout onto a semiconductor substrate and creating transfer information;

extracting a pattern larger than a process margin of the first physical layout on the basis of the transfer information; and creating a rule for the design rule check including information on the extracted pattern of the first physical layout and storing the created rule in the rule library.

15. The method of claim 13, wherein verification of the information concerning a yield of the second physical layout in the step of comparing the threshold with the information concerning a yield is performed by determining a threshold concerning a yield in advance and referring to the threshold concerning a yield.

16. The method of claim 13, wherein when P represents a probability that X is consecutive and put between sections "a" and "b", assuming that f(x) given by Equation (1) is a probability density function, $$P(a \leq X \leq b) = \int_a^b f(x)dx \qquad (1)$$

the information concerning a yield is given by a result obtained by taking into account a joint probability density function given by a joint density function of a two-dimensional probability variable (X,Y) for which a certain bivariate function f(x,y) is given by Equation (2), $$P(a \leq X \leq b, c \leq Y \leq d) = \int_a^b \int_c^d f(x, y)dxdy \qquad (2)$$

machining variation, assembly variation, and an experiment result.

17. The method of claim 16, wherein the joint probability density function is given by a product of probability densities concerning an exposure amount and a defocus amount of an exposure device that processes the second physical layout.

18. The method of claim 16, wherein the experiment result is a number of defects of a pattern after transfer on a semiconductor substrate.

19. The method of claim 13, wherein the pattern extracting step includes the steps of:

selecting a threshold concerning a process margin of the second physical layout; and extracting a pattern having a large process margin of the first physical layout from the threshold concerning a process margin of the second physical layout, the transfer information, and the rule library, and the second physical layout is verified with reference to the extracted first physical layout.

20. The method of claim 13, wherein the extraction of the second physical layout includes changing an attribute of the layout and creating a small area layout including a layout to be extracted.

21. A method of designing a semiconductor integrated circuit in creating a physical layout of the semiconductor integrated circuit from semiconductor integrated circuit design data using a designing apparatus, the method comprising the steps of:

virtually arranging and wiring, with the designing apparatus, cells to create the physical layout;

comparing, with the designing apparatus, with reference to a threshold concerning a yield of a second physical layout in a portion including the cells of the physical layout, the threshold with information concerning a yield of the second physical layout;

extracting, with the designing apparatus, only when the information concerning the yield of the second physical layout satisfies the threshold in the comparing step the second physical layout;

applying, with the designing apparatus, proximity correction and proximity correction verification to the second physical layout obtained in the layout extracting step;

performing, with the designing apparatus, when the information concerning the yield of the second physical layout does not satisfy the threshold in the comparing step, acquisition of transfer information of an area where the yield is equal to or lower than the threshold, amendment of the second physical layout of the area, and artwork processing;

applying, with the designing apparatus, proximity correction and proximity correction verification to the second physical layout subjected to the performing step; and creating, with the designing apparatus, mask data using the second physical layout subjected to the step of applying proximity correction and proximity correction verification.

22. An apparatus for designing a semiconductor integrated circuit that carries out a method of designing a semiconductor integrated circuit in creating a physical layout of the semiconductor integrated circuit from semiconductor integrated circuit design data, wherein the method of designing a semiconductor integrated circuit includes the steps of:

virtually arranging and wiring cells to create the physical layout;

verifying compliance with a design rule by comparing a shape of a second physical layout including the cells of the physical layout against a rule library;

creating, when the design rule is satisfied in the verifying step, mask data corresponding to the physical layout using the second physical layout;

performing, when the design rule is not satisfied in the verifying step, mask data processing for the verification-object second physical layout; and creating, using the second physical layout subjected to the mask data processing in the mask-data processing step, mask data corresponding to the physical layout.

23. A non-transitory computer-readable recording medium having recorded therein a method of designing a semiconductor integrated circuit in creating a physical layout of a semiconductor integrated circuit from semiconductor integrated circuit design data, wherein the method of designing a semiconductor integrated circuit includes the steps of:

virtually arranging and wiring cells to create the physical layout;

verifying compliance with a design rule by comparing a shape of a second physical layout including the cells of the physical layout against a rule library;

creating, when the design rule is satisfied in the verifying step, mask data corresponding to the physical layout using the second physical layout;

performing, when the design rule is not satisfied in the verifying step, mask data processing for the verification-object second physical layout; and creating, using the second physical layout subjected to the mask data processing in the mask-data processing step, mask data corresponding to the physical layout.

24. A method for manufacturing a mask using a method of designing a semiconductor integrated circuit in creating a physical layout of a semiconductor integrated circuit from semiconductor integrated circuit design data, wherein the method of designing a semiconductor integrated circuit includes the steps of:

virtually arranging and wiring cells to create the physical layout;

verifying compliance with a design rule by comparing a shape of a second physical layout including the cells of the physical layout against a rule library;

creating, when the design rule is satisfied in the verifying step, mask data corresponding to the physical layout using the second physical layout;

performing, when the design rule is not satisfied in the verifying step, mask data processing for the verification-object second physical layout; and creating, using the second physical layout subjected to the mask data processing in the mask-data processing step, mask data corresponding to the physical layout.

25. An apparatus for designing a semiconductor integrated circuit that carries out a method of designing a semiconductor integrated circuit in creating a physical layout of a semiconductor integrated circuit from semiconductor integrated circuit design data, wherein the method of designing a semiconductor integrated circuit includes the steps of:

virtually arranging and wiring cells to create the physical layout;

verifying compliance with a design rule by comparing a shape of a second physical layout including the cells of the physical layout against a rule library;

judging whether proximity correction is applied to the second physical layout that satisfies the design rule in the verifying step;

creating, when it is judged in the correction judging step that the correction is unnecessary, mask data corresponding to the physical layout using the second physical layout for which it is judged that the correction is unnecessary;

applying, when it is judged in the correction judging step that the correction is necessary, proximity correction to the judgment-object second physical layout;

creating mask data corresponding to the physical layout using the second physical layout corrected in the step of applying proximity correction;

applying, when the design rule is not satisfied in the verifying step, proximity correction to the verification-object second physical layout;

verifying whether the second physical layout subjected to the proximity correction in the proximity correction step has a predetermined process margin;

extracting, when it is judged in the process-margin verifying step that the second physical layout has the process margin, a judgment-object second physical layout, adding a rule of the second physical layout to the rule library, and creating mask data of the physical layout corresponding to the second physical layout;

performing, when it is judged in the process-margin verifying step that the second physical layout does not have the process margin, correction, artwork, proximity correction, and proximity correction verification for a pattern of the judgment-object second physical layout; and creating mask data corresponding to the physical layout using the second physical layout subjected to the step of performing correction, artwork, proximity correction, and proximity correction verification.

26. A non-transitory computer-readable recording medium having recorded therein a method of designing a semiconductor integrated circuit in creating a physical layout of a semiconductor integrated circuit from semiconductor integrated circuit design data, wherein the method of designing a semiconductor integrated circuit includes the steps of:

virtually arranging and wiring cells to create the physical layout;

verifying compliance with a design rule by comparing a shape of a second physical layout including the cells of the physical layout against a rule library;

judging whether proximity correction is applied to the second physical layout that satisfies the design rule in the verifying step;

creating, when it is judged in the correction judging step that the correction is unnecessary, mask data corresponding to the physical layout using the second physical layout for which it is judged that the correction is unnecessary;

applying, when it is judged in the correction judging step that the correction is necessary, proximity correction to the judgment-object second physical layout;

creating mask data corresponding to the physical layout using the second physical layout corrected in the step of applying proximity correction;

applying, when the design rule is not satisfied in the verifying step, proximity correction to the verification-object second physical layout;

verifying whether the second physical layout subjected to the proximity correction in the proximity correction step has a predetermined process margin;

extracting, when it is judged in the process-margin verifying step that the second physical layout has the process margin, a judgment-object second physical layout, adding a rule of the second physical layout to the rule library, and creating mask data of the physical layout corresponding to the second physical layout;

performing, when it is judged in the process-margin verifying step that the second physical layout does not have the process margin, correction, artwork, proximity correction, and proximity correction verification for a pattern of the judgment-object second physical layout; and creating mask data corresponding to the physical layout using the second physical layout subjected to the step of performing correction, artwork, proximity correction, and proximity correction verification.

27. A method for manufacturing a mask using a method of designing a semiconductor integrated circuit in creating a physical layout of a semiconductor integrated circuit from semiconductor integrated circuit design data, wherein the method of designing a semiconductor integrated circuit includes the steps of:

virtually arranging and wiring cells to create the physical layout;

verifying compliance with a design rule by comparing a shape of a second physical layout including the cells of the physical layout against a rule library;

judging whether proximity correction is applied to the second physical layout that satisfies the design rule in the verifying step;

creating, when it is judged in the correction judging step that the correction is unnecessary, mask data corresponding to the physical layout using the second physical layout for which it is judged that the correction is unnecessary;

applying, when it is judged in the correction judging step that the correction is necessary, proximity correction to the judgment-object second physical layout;

creating mask data corresponding to the physical layout using the second physical layout corrected in the step of applying proximity correction;

applying, when the design rule is not satisfied in the verifying step, proximity correction to the verification-object second physical layout;

verifying whether the second physical layout subjected to the proximity correction in the proximity correction step has a predetermined process margin;

extracting, when it is judged in the process-margin verifying step that the second physical layout has the process margin, a judgment-object second physical layout, adding a rule of the second physical layout to the rule library, and creating mask data of the physical layout corresponding to the second physical layout;

performing, when it is judged in the process-margin verifying step that the second physical layout does not have the process margin, correction, artwork, proximity correction, and proximity correction verification for a pattern of the judgment-object second physical layout; and creating mask data corresponding to the physical layout using the second physical layout subjected to the step of performing correction, artwork, proximity correction, and proximity correction verification.

28. An apparatus for designing a semiconductor integrated circuit that carries out a method of designing a semiconductor integrated circuit in creating a physical layout of the semiconductor integrated circuit from semiconductor integrated circuit design data, wherein the method of designing a semiconductor integrated circuit includes the steps of:

virtually arranging and wiring cells to create the physical layout;

calculating contrast of the physical layout and comparing, with reference to a threshold concerning contrast of an image on a semiconductor substrate of a layout obtained by arranging and wiring the respective cells, the threshold with a result of the calculation of contrast;

performing, when the result of the calculation of contrast is equal to or lower than the threshold concerning contrast in the step of comparing a threshold and contrast, acquisition of transfer information of an area where the contrast is equal to or lower than the threshold, amendment of a physical layout of the area, and artwork processing;

applying proximity correction and proximity correction verification to the physical layout subjected to the step of performing acquisition of transfer information, amendment of a physical layout, and artwork processing;

creating mask data using the physical layout subjected to the step of applying proximity correction and proximity correction verification;

comparing, when a result of the calculation of contrast of the layout is larger than the threshold concerning contrast in the step of comparing a threshold and contrast, with reference to the threshold concerning coverage of the physical layout, the threshold with information concerning coverage of the obtained layout; and extracting, when the information concerning the coverage satisfies the threshold concerning coverage in the step of comparing a threshold concerning coverage and information concerning coverage, a judgment-object physical layout, wherein, the step of applying proximity correction and proximity correction verification and the subsequent steps are applied to the physical layout obtained in the layout extracting step, and when the information concerning coverage does not satisfy the threshold concerning coverage in the step of comparing a threshold concerning coverage and information concerning coverage, the step of applying proximity correction and proximity correction verification and the subsequent steps are performed.

29. A non-transitory computer-readable recording medium having recorded therein a method of designing a semiconductor integrated circuit in creating a physical layout of the semiconductor integrated circuit from semiconductor integrated circuit design data, wherein the method of designing a semiconductor integrated circuit includes the steps of:
- virtually arranging and wiring cells to create the physical layout;
- calculating contrast of the physical layout and comparing, with reference to a threshold concerning contrast of an image on a semiconductor substrate of a layout obtained by arranging and wiring the respective cells, the threshold with a result of the calculation of contrast;
- performing, when the result of the calculation of contrast is equal to or lower than the threshold concerning contrast in the step of comparing a threshold and contrast, acquisition of transfer information of an area where the contrast is equal to or lower than the threshold, amendment of a physical layout of the area, and artwork processing;
- applying proximity correction and proximity correction verification to the physical layout subjected to the step of performing acquisition of transfer information, amendment of a physical layout, and artwork processing;
- creating mask data using the physical layout subjected to the step of applying proximity correction and proximity correction verification;
- comparing, when a result of the calculation of contrast of the layout is larger than the threshold concerning contrast in the step of comparing a threshold and contrast, with reference to the threshold concerning coverage of the physical layout, the threshold with information concerning coverage of the obtained layout; and
- extracting, when the information concerning the coverage satisfies the threshold concerning coverage in the step of comparing a threshold concerning coverage and information concerning coverage, a judgment-object physical layout, wherein,
- the step of applying proximity correction and proximity correction verification and the subsequent steps are applied to the physical layout obtained in the layout extracting step, and
- when the information concerning coverage does not satisfy the threshold concerning coverage in the step of comparing a threshold concerning coverage and information concerning coverage, the step of applying proximity correction and proximity correction verification and the subsequent steps are performed.

30. A method for manufacturing a mask using a method of designing a semiconductor integrated circuit in creating a physical layout of the semiconductor integrated circuit from semiconductor integrated circuit design data, wherein the method of designing a semiconductor integrated circuit includes the steps of:
- virtually arranging and wiring cells to create the physical layout;
- calculating contrast of the physical layout and comparing, with reference to a threshold concerning contrast of an image on a semiconductor substrate of a layout obtained by arranging and wiring the respective cells, the threshold with a result of the calculation of contrast;
- performing, when the result of the calculation of contrast is equal to or lower than the threshold concerning contrast in the step of comparing a threshold and contrast, acquisition of transfer information of an area where the contrast is equal to or lower than the threshold, amendment of a physical layout of the area, and artwork processing;
- applying proximity correction and proximity correction verification to the physical layout subjected to the step of performing acquisition of transfer information, amendment of a physical layout, and artwork processing;
- creating mask data using the physical layout subjected to the step of applying proximity correction and proximity correction verification;
- comparing, when a result of the calculation of contrast of the layout is larger than the threshold concerning contrast in the step of comparing a threshold and contrast, with reference to the threshold concerning coverage of the physical layout, the threshold with information concerning coverage of the obtained layout; and
- extracting, when the information concerning the coverage satisfies the threshold concerning coverage in the step of comparing a threshold concerning coverage and information concerning coverage, a judgment-object physical layout, wherein,
- the step of applying proximity correction and proximity correction verification and the subsequent steps are applied to the physical layout obtained in the layout extracting step, and
- when the information concerning coverage does not satisfy the threshold concerning coverage in the step of comparing a threshold concerning coverage and information concerning coverage, the step of applying proximity correction and proximity correction verification and the subsequent steps are performed.

31. An apparatus for designing a semiconductor integrated circuit that carries out a method of designing a semiconductor integrated circuit in creating a physical layout of the semiconductor integrated circuit from semiconductor integrated circuit design data, wherein the method of designing a semiconductor integrated circuit includes the steps of:
- virtually arranging and wiring cells to create the physical layout;
- verifying, with reference to a rule library for design rule check, whether a second physical layout of a portion including the cells of the physical layout has a predetermined process margin;
- judging, when the second physical layout has the process margin in the step of verifying whether a second physical layout has a predetermined process margin, whether the second physical layout having the margin should be corrected;
- creating, when it is judged in the correction judging step that the correction is unnecessary, mask data corresponding to the physical layout using the second physical layout for which it is judged that the correction is unnecessary;
- subjecting, when it is judged in the correction judging step that the correction is necessary, the judgment-object second physical layout to proximity correction and proximity correction verification;
- creating mask data corresponding to the physical layout using the second physical layout subjected to the proximity correction and the proximity correction verification in the step of applying proximity correction and proximity correction verification;
- subjecting, when the second physical layout does not have the process margin in the step of verifying whether a second physical layout has a predetermined process margin, the verification-object second physical layout to proximity correction and proximity correction verification;

comparing, with reference to a threshold concerning a yield of the second physical layout, the threshold with information concerning a yield of the second physical layout;
extracting, when the information concerning a yield satisfies the threshold concerning a yield in the step of comparing the threshold with the information concerning a yield, a judgment-object second physical layout, and adding a rule of the second physical layout to the rule library;
performing, when the information concerning a yield does not satisfy the threshold concerning a yield in the step of comparing the threshold with the information concerning a yield, acquisition of transfer information of an area where the yield is equal to or lower than the threshold, amendment of a second physical layout of the area, and artwork processing;
applying proximity correction and proximity correction verification to the second physical layout subjected to the step of performing acquisition of transfer information, amendment of a physical layout, and artwork processing; and
creating mask data using the second physical layout subjected to the step of applying proximity correction and proximity correction verification.

32. A non-transitory computer-readable recording medium having recorded therein a method of designing a semiconductor integrated circuit in creating a physical layout of the semiconductor integrated circuit from semiconductor integrated circuit design data, wherein the method of designing a semiconductor integrated circuit includes the steps of:
virtually arranging and wiring cells to create the physical layout;
verifying, with reference to a rule library for design rule check, whether a second physical layout of a portion including the cells of the physical layout has a predetermined process margin;
judging, when the second physical layout has the process margin in the step of verifying whether a second physical layout has a predetermined process margin, whether the second physical layout having the margin should be corrected;
creating, when it is judged in the correction judging step that the correction is unnecessary, mask data corresponding to the physical layout using the second physical layout for which it is judged that the correction is unnecessary;
subjecting, when it is judged in the correction judging step that the correction is necessary, the judgment-object second physical layout to proximity correction and proximity correction verification;
creating mask data corresponding to the physical layout using the second physical layout subjected to the proximity correction and the proximity correction verification in the step of applying proximity correction and proximity correction verification;
subjecting, when the second physical layout does not have the process margin in the step of verifying whether a second physical layout has a predetermined process margin, the verification-object second physical layout to proximity correction and proximity correction verification;
comparing, with reference to a threshold concerning a yield of the second physical layout, the threshold with information concerning a yield of the second physical layout;
extracting, when the information concerning a yield satisfies the threshold concerning a yield in the step of comparing the threshold with the information concerning a yield, a judgment-object second physical layout, and adding a rule of the second physical layout to the rule library;
performing, when the information concerning a yield does not satisfy the threshold concerning a yield in the step of comparing the threshold with the information concerning a yield, acquisition of transfer information of an area where the yield is equal to or lower than the threshold, amendment of a second physical layout of the area, and artwork processing;
applying proximity correction and proximity correction verification to the second physical layout subjected to the step of performing acquisition of transfer information, amendment of a physical layout, and artwork processing; and
creating mask data using the second physical layout subjected to the step of applying proximity correction and proximity correction verification.

33. A method for manufacturing a mask using a method of designing a semiconductor integrated circuit in creating a physical layout of the semiconductor integrated circuit from semiconductor integrated circuit design data, wherein the method of designing a semiconductor integrated circuit includes the steps of:
virtually arranging and wiring cells to create the physical layout;
verifying, with reference to a rule library for design rule check, whether a second physical layout of a portion including the cells of the physical layout has a predetermined process margin;
judging, when the second physical layout has the process margin in the step of verifying whether a second physical layout has a predetermined process margin, whether the second physical layout having the margin should be corrected;
creating, when it is judged in the correction judging step that the correction is unnecessary, mask data corresponding to the physical layout using the second physical layout for which it is judged that the correction is unnecessary;
subjecting, when it is judged in the correction judging step that the correction is necessary, the judgment-object second physical layout to proximity correction and proximity correction verification;
creating mask data corresponding to the physical layout using the second physical layout subjected to the proximity correction and the proximity correction verification in the step of applying proximity correction and proximity correction verification;
subjecting, when the second physical layout does not have the process margin in the step of verifying whether a second physical layout has a predetermined process margin, the verification-object second physical layout to proximity correction and proximity correction verification;
comparing, with reference to a threshold concerning a yield of the second physical layout, the threshold with information concerning a yield of the second physical layout;
extracting, when the information concerning a yield satisfies the threshold concerning a yield in the step of comparing the threshold with the information concerning a yield, a judgment-object second physical layout, and adding a rule of the second physical layout to the rule library;

performing, when the information concerning a yield does not satisfy the threshold concerning a yield in the step of comparing the threshold with the information concerning a yield, acquisition of transfer information of an area where the yield is equal to or lower than the threshold, amendment of a second physical layout of the area, and artwork processing;

applying proximity correction and proximity correction verification to the second physical layout subjected to the step of performing acquisition of transfer information, amendment of a physical layout, and artwork processing; and creating mask data using the second physical layout subjected to the step of applying proximity correction and proximity correction verification.

* * * * *